(12) United States Patent
Thaniyavarn

(10) Patent No.: US 10,018,888 B2
(45) Date of Patent: Jul. 10, 2018

(54) ADVANCED TECHNIQUES FOR IMPROVING HIGH-EFFICIENCY OPTICAL MODULATORS

(71) Applicant: EOSpace Inc., Redmond, WA (US)

(72) Inventor: Suwat Thaniyavarn, Bellevue, WA (US)

(73) Assignee: EOSpace, Inc., Redmond, WA (US)

( * ) Notice: Subject to any disclaimer, the term of this patent is extended or adjusted under 35 U.S.C. 154(b) by 718 days.

(21) Appl. No.: 13/911,550

(22) Filed: Jun. 6, 2013

(65) Prior Publication Data

US 2014/0205229 A1   Jul. 24, 2014

Related U.S. Application Data

(60) Provisional application No. 61/656,341, filed on Jun. 6, 2012.

(51) Int. Cl.
  *G02F 1/35*   (2006.01)
  *G02F 1/225*   (2006.01)
  (Continued)

(52) U.S. Cl.
  CPC ............ *G02F 1/225* (2013.01); *G02F 1/2255* (2013.01); *G02F 1/0316* (2013.01);
  (Continued)

(58) Field of Classification Search
  None
  See application file for complete search history.

(56) References Cited

U.S. PATENT DOCUMENTS 5,359,412 A   10/1994 Schulz
5,724,169 A   3/1998 LeGasse
(Continued)

FOREIGN PATENT DOCUMENTS

JP   2001-174766   6/2001
JP   2001-174766   7/2001
(Continued)

OTHER PUBLICATIONS

Machine Transalation of JP 2007025369 A, Kono et al, Feb. 1, 2007.*

*Primary Examiner* — Hemang Sanghavi
(74) *Attorney, Agent, or Firm* — James Creighton Wray; Meera P. Narasimhan

(57) ABSTRACT

Improved optical interferometric modulators have a small waveguide spacing so that the waveguide pair are close to the central electrode, to enhance electro-optic interaction. Asymmetric waveguides with differential indices are used to effectively de-couple the waveguide pair. Multiple sections of asymmetric waveguide pairs with alternating differential indices are used to achieve chirp-free operation. Another version of the device utilizes transmission-line electrode that weave closer to one of the waveguide pair alternately between sections. Another version of the device utilizes waveguide structure that one of the waveguide is closer to the central electrode in alternate section. To improve efficiency further, a DC bias is provided on the outer electrodes configured as an RF-ground but DC-float electrodes. Another improvement is to have a slot is cut underneath the waveguide region to effectively reduce to thickness of the substrate. These improvements lead to higher modulator efficiency.

30 Claims, 16 Drawing Sheets

(51) Int. Cl.
*G02F 1/03* (2006.01)
*G02F 1/035* (2006.01)
*G02F 1/21* (2006.01)

(52) U.S. Cl.
CPC ...... *G02F 1/0356* (2013.01); *G02F 2001/212* (2013.01); *G02F 2201/127* (2013.01)

(56) References Cited

U.S. PATENT DOCUMENTS

| | | | |
|---|---|---|---|
| 6,842,569 B2 | 1/2005 | Thaniyavarn | |
| 7,290,328 B2* | 11/2007 | Kondo et al. | ................... 29/825 |
| 7,643,708 B2 | 1/2010 | Kawano | |
| 7,701,630 B2* | 4/2010 | Kissa | ................... G02F 1/2255 359/245 |
| 7,916,981 B2* | 3/2011 | Kawano et al. | ................... 385/1 |
| 8,463,081 B1* | 6/2013 | Kissa | ................... G02F 1/2255 359/238 |
| 8,565,559 B2* | 10/2013 | Hara | ................... 385/3 |
| 9,557,624 B2* | 1/2017 | Sugiyama | ................... G02F 1/0316 |
| 2002/0159666 A1* | 10/2002 | Gates, II | ................... G02F 1/2255 385/2 |
| 2006/0120654 A1* | 6/2006 | Aoki | ................... G02F 1/2255 385/2 |
| 2009/0034898 A1 | 2/2009 | Kawano | |
| 2011/0081107 A1* | 4/2011 | Sugiyama | ................... G02F 1/0356 385/2 |

FOREIGN PATENT DOCUMENTS

| | | |
|---|---|---|
| JP | 2005-107225 | 4/2005 |
| JP | 2005-107229 | 4/2005 |
| JP | 2007025369 A * | 2/2007 |

* cited by examiner

FIG. 6a
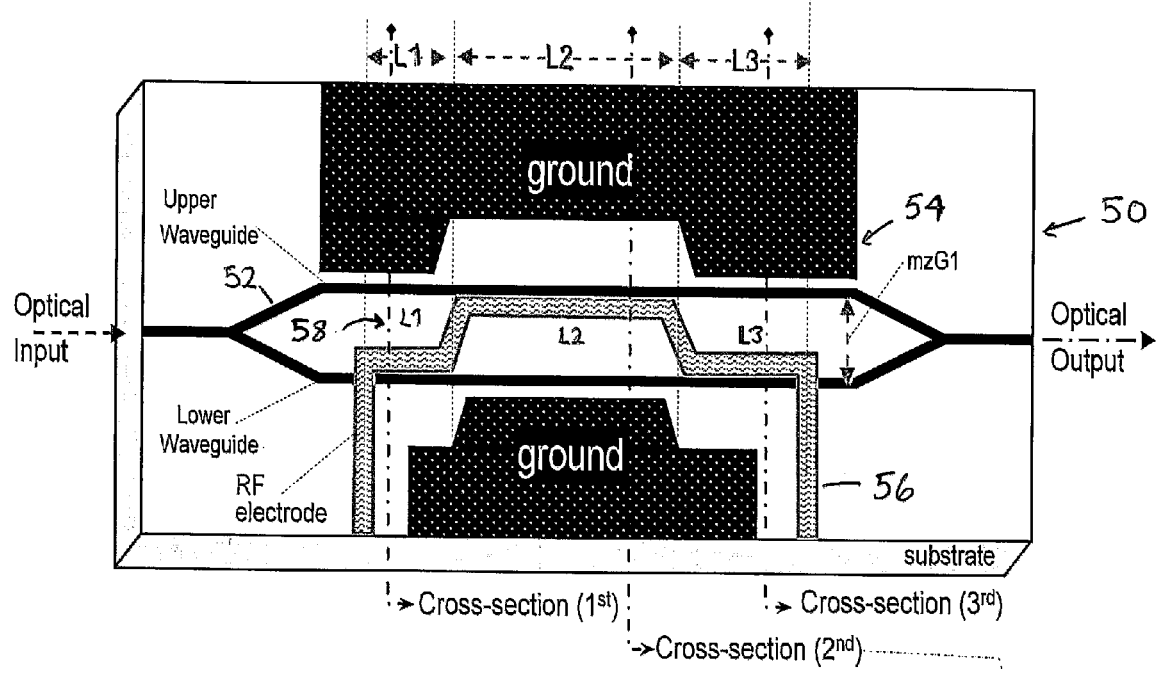
FIG. 6b
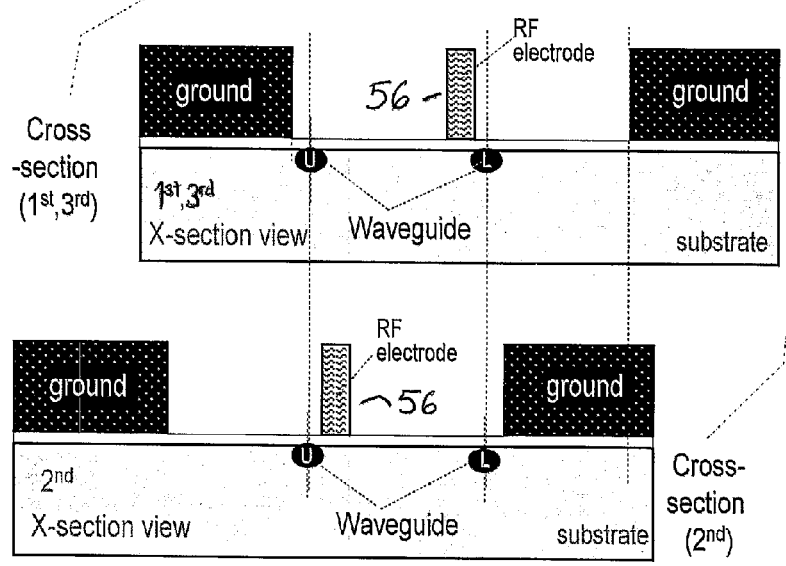
FIG. 6c

FIG. 8a                    PRIOR ART
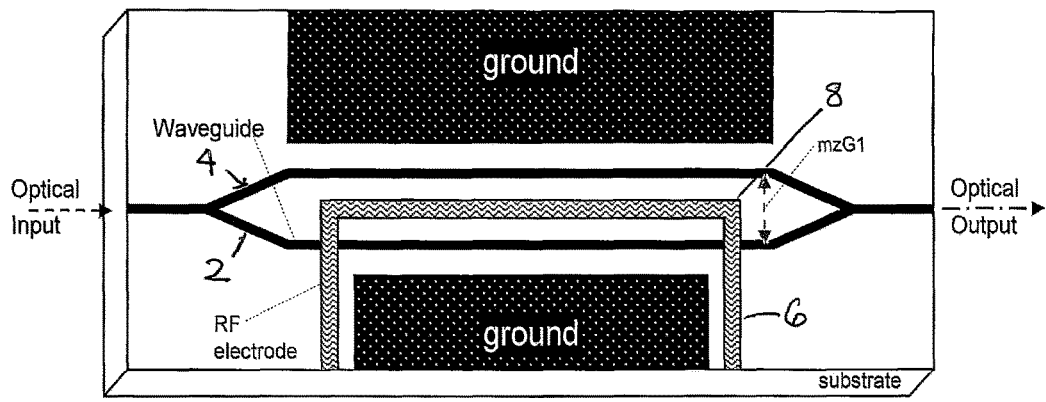
FIG. 8b                    PRIOR ART
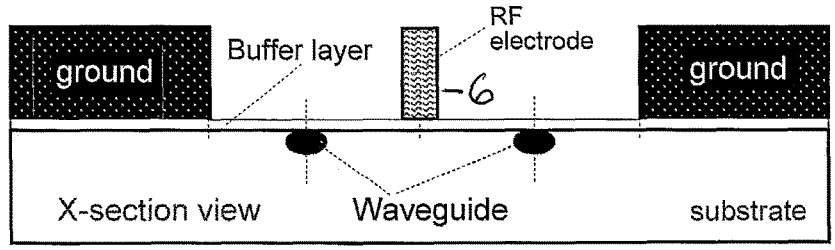
FIG. 8c
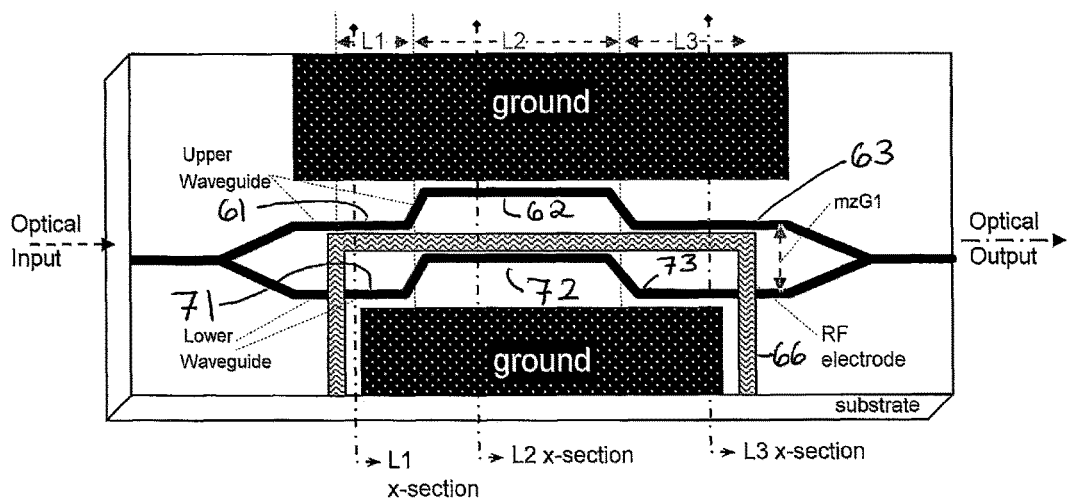

PRIOR ART

US 10,018,888 B2

ADVANCED TECHNIQUES FOR IMPROVING HIGH-EFFICIENCY OPTICAL MODULATORS

This application claims the benefit of U.S. Provisional Application No. 61/656,341 filed Jun. 6, 2012, which is hereby incorporated by reference in its entirety as if fully set forth herein.

BACKGROUND OF THE INVENTION

A high-efficiency optical modulator is the key optical component used for converting an electrical signal to optical signal for fiber-optic or free-space transmissions. Such a device has a wide range of applications for broadband 'digital' fiber-optic telecommunication systems, and 'analog' signal transmissions such as fiber-optic antenna remoting, sensing, surveillance systems, and etc.

The most common optical modulator product is the wideband electro-optic $LiNbO_3$ device based on a Mach-Zehnder (MZ) interferometer singlemode waveguide structure with a traveling-wave transmission line electrode. These inventions are aimed at improving the design of these conventional MZ modulators.

Optical waveguide modulators have been around for the last 40 years. There are many examples of work on this electro-optic $LiNbO_3$ device based on a Mach-Zehnder (MZ) interferometer waveguide structure with a traveling-wave transmission line electrode structure. Please see for example: "A Review of Lithium Niobate Modulators for Fiber-Optic Communications Systems", Ed L. Wooten, et al., IEEE Journal of Selected Topics in Quantum Electronics, Vol. 6, No. 1, January/February 2000.

Wideband electro-optic waveguide modulators based on a Mach-Zehnder interferometer waveguide structure are the most widely used optical modulators. However, the modulator efficiency is not as high as it should be. This is due to the large spacing required between the MZ waveguide pair to eliminate optical coupling between the waveguide pair. The result is that the waveguides are relatively far from the central electrode of a CPW (Coplanar-waveguide) transmission-line electrode structure, leading to a non-optimum electro-optic field interaction inside the waveguide pair, which limits the achievable efficiency. A simple reduction in the spacing between the waveguide pair so that the waveguide pair are closer to the central electrode where the applied electric field is much stronger, to improve the electric field strength inside the waveguide pair does not work, since the optical waveguides will couple to each other leading to degradation in the transfer function.

Needs exist for improved high efficiency optical modulators.

SUMMARY OF THE INVENTION

The invention describes advanced techniques to improve efficiency of an electro-optical modulator. The invention provides techniques to achieve a higher modulator efficiency by enhancing the electro-optic field interaction by having the waveguides much closer to the central electrode of the CPW transmission-line electrode, while maintaining the modulators' optical transmission characteristics.

The invention provides electro-optical waveguide interferometric modulators having a singlemode optical waveguide input, a singlemode optical waveguide output, a pair of coupled waveguides having first ends connected to the optical input and having second ends connected to the optical output, a central electrode of the CPW (Coplanar waveguide) transmission-line electrode structure positioned between the coupled waveguides, first and second grounds positioned outward from the coupled waveguides, a radio frequency electrical source connected to the electrode, and improved electro-optic conversion efficiency by enhancing the electric field inside the coupled waveguides with a smaller waveguide spacing as compared to conventional Mach-Zehnder interferometric modulator with un-coupled waveguide pair using a large waveguide spacing. Smaller waveguide spacing using a coupled waveguide pair means the waveguides are closer to the central electrode and see an enhanced electric field leading to a higher modulation efficiency.

A radio frequency electric signal applied to the traveling-wave CPW transmission-line electrode generates electric field inside the waveguide pair and induces changes in the waveguide index via the linear electro-optic. Without additional adjustment, the optical transmission as a function on an applied voltage of an interferometer modulator using an optically-coupled-waveguide pair with symmetric waveguide can have degraded response characteristics with poor modulation depth. In this invention, the coupled waveguides are asymmetric with different effective waveguide indices. The use of an asymmetric waveguide pair essentially de-couples the smaller-spacing waveguide pair, and restores the optical response characteristics to that of an interferometer with high modulation depth. With the smaller waveguide spacing, the waveguide pair is closer to the center electrode and sees stronger electric field leading to a higher modulation efficiency.

In one form of the invention, waveguides in the asymmetric coupled waveguide pair have sections of different widths or different waveguide fabrication parameters. The coupled waveguides have different effective waveguide indices $(n \pm \Delta n)$, wherein the n corresponds to an effective waveguide index. The coupled waveguides comprise first and second waveguides, each having more than one section with different waveguide indices. As an example, the first waveguide has a first $n+\alpha n$ section and a second $n-\Delta n$ section, and the second waveguide has a first $n-\Delta n$ section and a second $n+\alpha n$ section. By using two equal-length sections of asymmetric waveguide pairs (with reversed $\Delta n$ between the two sections), any potential optical chirp due to any slight asymmetry in the electro-optic induced change in the indices between the two asymmetric waveguide pairs can be eliminated, resulting in a desirable chirp-free operation.

In one example, the first waveguide in the coupled pair has an $n-\Delta n$ first section, an $n+\alpha n$ second section and an $n-\Delta n$ third section. The second waveguide has an $n+\alpha n$ first section, an $n-\Delta n$ second section and an $n+\alpha n$ third section. Electric fields generated by first, second and third sections of the electrode are $E_1$, $E_2$ and $E_3$. Lengths of the respective waveguide sections are $L_1$, $L_2$ and $L_3$. For a transmission-line type electrode structure, the same electric signal is launched and propagating down the transmission from section 1 to 2 to 3. The difference in the representative average electric field $E_1$, $E_2$, and $E_3$ in each section can be due to the natural electric signal loss as a function of propagation distance in the transmission-line, which is also a function of the frequencies. By selecting the electrode length properly so that the cumulative electro-optic interaction satisfies $E_2 \cdot _2 = E_1 \cdot L_1 + E_3 \cdot L_3$ condition at a low and high frequency, a zero-chirp operation can be achieved for a range of frequency, even in the case where electrical transmission loss increases as a function of propagation distance and RF frequency. In other embodiments, sections greater than three are used in the first and second waveguides.

In one form of the invention, the electrode is shaped to have more than one section. In this case, the waveguide pair can either be sufficiently separated so that they are optically un-coupled, or a smaller spacing coupled waveguide pair with asymmetric waveguides to effectively de-couple the waveguide pair. The sections of the central electrode are positioned alternately closer to one of the waveguides sequential sections of the first and second waveguides. Since the electric field is greatly enhanced near the central electrode, the overall electro-optic interaction efficiency is increased. This technique can be applied to a conventional MZ modulator with un-coupled waveguide pair with large waveguide spacing, or to our proposed invention using asymmetric coupled waveguide pair with smaller waveguide spacing.

In one form, the central electrode and the first and second grounds have three sequential sections. The first section of the central electrode is positioned closer to the first section of the first waveguide. The second section of the central electrode is positioned closer to the second section of the second waveguide. The third section of the central electrode is positioned closer to the third section of the first waveguide. The lengths of the electrode and ground sections are $L_1$, $L_2$ and $L_3$. Effective electrical fields generated by the central electrode and the grounds are $E_1$, $E_2$ and $E_3$. The lengths of the sections are established so that $E_2 \cdot L_2 = E_1 \cdot L_1 + E_3 \cdot L_3$ at low and high frequencies. This condition is to achieve chirp-free operation for a range of frequency even in the case where electrical transmission loss increases as a function of propagation distance and RF frequency.

In another example of the invention, an electrode is uniform. First and second waveguides in the middle section of the waveguide interferometer circuit are shaped to form more than one section. The sections of the first waveguides are positioned alternately closer to and further from the central electrode. Sections of the second waveguide are positioned alternately further from and closer to the central electrode.

When the first and second waveguides have three or more sections, a first section of the first waveguide is positioned closer to the central electrode, a second section of the second waveguide is positioned closer to the central electrode, and a third section of the first waveguide is positioned closer to the central electrode, so that one of the waveguides closer to the central electrode see an enhanced electric field, alternatively from one section to the other.

The first, second and third sections of the waveguides have lengths of $L_1$, $L_2$ and $L_3$. Effective electrical fields generated along the electrode are $E_1$, $E_2$ and $E_3$. Lengths of $L_1$, $L_2$ and $L_3$ of the waveguides are controlled so that $E_2 \cdot L_2 = E_1 \cdot L_1 + E_3 \cdot L_3$ at a low and high frequency. This condition is to achieve chirp free operation for a range of frequency even in the case where electrical transmission loss increases as a function of propagation distance and RF frequency.

One embodiment of the invention has a first electrode and a second electrode sections. A first electrode section is a CPW transmission-line electrode for broadband Radio Frequency (RF) input, and the second electrode section is for a DC bias voltage input. The RF input is connected to a first end of the first transmission-line electrode, and a resistive termination is connected to a second end of the first electrode. A DC bias source is connected to the second electrode to set the operating point of the electro-optic interferometer waveguide modulator.

In another embodiment of the invention, one long electrode has both an RF signal and a DC bias input. A capacitor for inputting the RF signal and a DC bias input are connected to an end of the electrode. A second capacitor is connected to a second end of the electrode as a DC block, and a resistive termination is connected to the second capacitor. The DC block is used to block DC current to the resistive termination.

In another embodiment, the CPW electrode has a central electrode and two outer electrode structures, normally used as RF and DC ground. A resistive termination is connected to a second end of the central electrode and the two outer electrodes. One of the outer ground (first) electrodes of the CPW transmission-line electrode has input and output ends connected to capacitors before connected to the common ground. This configuration means this particular first outer ground electrode is an RF ground, but a DC float. This is because the capacitors behave as an RF-short to an RF signal, but it behaves as an open circuit to a DC signal. A connection for a DC bias is connected to this first outer ground (RF ground and a DC float) electrode structure for biasing the device to set the operating point. For the other outer ground electrode, the input and output ends can be connected to the common ground without capacitor chips to form both RF and DC ground. In a further embodiment, capacitor chips are used at the input and the output ends of both outer ground electrodes, forming an RF ground and a DC float for both of the outer electrode structures, in which DC bias can be applied to each of the outer electrode pair.

In one embodiment of the invention, the first outer ground is positioned along a first side of the substrate. A second outer ground is positioned along a second opposite side of the substrate. The central electrode is positioned between the first and second. A slot is cut from the side of the substrate, extending from the first side under the first ground, the middle waveguide pair of the interferometric waveguide structure, and the central electrode and under a part of the second outer ground. The slot is formed by a dicing saw. A thin substrate remains under the first ground, the middle waveguide pair of the interferometer, the central electrode and a part of the second outer ground. The slot is an air gap or it is filled with a low dielectric material. The thin substrate left on top of the slot should be thinner than the spacing between the central and outer electrode pair of the CPW transmission-line electrode. The effect of the slot underneath the waveguide circuit and the CPW electrode structure is used to confine the electric field generated by the CPW electrode to a much shallower region and thus to enhance the electric field inside the optical waveguide circuit, leading to higher electro-optic interaction and thus to an increase in the modulation efficiency.

These and further and other objects and features of the invention are apparent in the disclosure, which includes the above and ongoing written specification, with the claims and the drawings.

BRIEF DESCRIPTION OF THE DRAWINGS

FIG. 6a is a schematic illustration of an MZ waveguide modulator using a modified CPW Transmission-line electrode.

FIG. 6b is a cross-section view of the 1st and 3rd sections of an MZ waveguide modulator using a modified CPW Transmission-line electrode.

FIG. 6c is a cross-section view of the 2nd section of an MZ waveguide modulator using a modified CPW Transmission-line electrode.

FIG. 8a is a schematic illustration of an MZ Interferometer-type waveguide modulator based on X-cut Y-propagation $LiNbO_3$ with traveling-wave electrode.

FIG. 8b is a cross-section view of an MZ Interferometer-type waveguide modulator based on X-cut Y-propagation $LiNbO_3$ with traveling-wave electrode.

FIG. 8c is a schematic illustration of an MZ modulator using a modified waveguide structure in which the waveguide pair weaves back and forth around the CPW transmission-line electrode.

DETAILED DESCRIPTION

This invention describes advanced techniques to improve the efficiency of electro-optical waveguide modulators such as those fabricated on electro-optic material such as $LiNbO_3$ substrate. These invention concepts can be applied to other types of modulators such as those fabricated on polymer, semiconductor, etc. These individual techniques can be applied separately or combined to realize higher efficiency modulators.

For clarity, these advanced techniques are described as applied to one of the most common and widely used optical modulators, namely wideband traveling-wave X-cut Y-propagation $LiNbO_3$ Mach-Zehnder (MZ) electro-optic waveguide modulators, as prime examples.

First described is the creation and operation of this $LiNbO_3$ MZ waveguide modulator followed by the inventions to improve this conventional device design.

Figure 1:
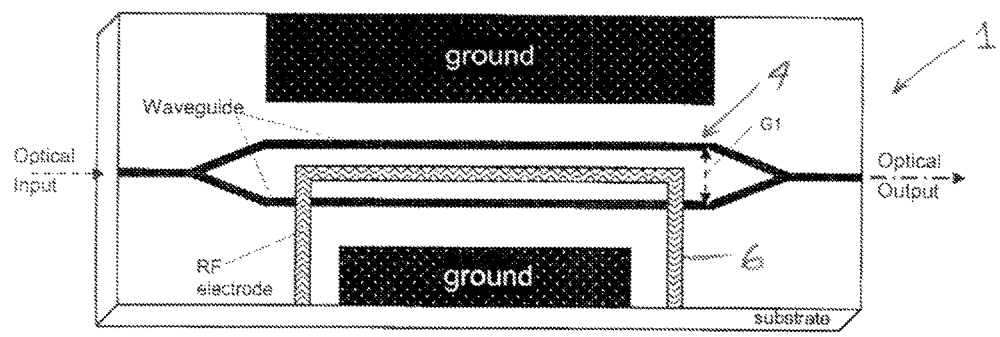
FIG. 1 is a schematic illustration of a Mach-Zehnder (MZ) Interferometer-type waveguide modulator based on X-cut Y-propagation LiNbO$_3$ with traveling-wave transmission-line electrode.

Currently, one of the most widely-used optical modulators is a Mach-Zehnder (MZ) interferometer waveguide intensity modulator based on X-cut Y-propagation electro-optic $LiNbO_3$ singlemode waveguide structure 1, as shown schematically in FIG. 1. The spacing between the pair of waveguides in the middle section for a conventional MZ interferometer modulator is sufficiently large so that the waveguides are optically un-coupled. The broadband electrode structure is typically based on CPW (Coplanar waveguide) RF transmission-line structure, which consist of a central electrode with two outer ground electrode structure. The electric field inside the electro-optic substrate generated by an applied voltage to the CPW transmission-line electrode typically has a peak (strongest) electric field near the edge of the central electrode structure.

The LiNbO$_3$ electro-optic waveguide modulator is quite efficient owing to tight confinement of the light signal inside the optical waveguide. However, in a typical conventional design of the MZ waveguide modulator, the modulation efficiency is not as high as it should be.

This is due to the fact that the MZ waveguide pair 4 in the middle section of the modulator has to be sufficiently separated with large enough spacing G1 to avoid the optical transmission function degradation (poor "peak-null" modulation depth) due to optical coupling between the waveguide pair. Therefore, the waveguide pair 4 spacing G1 cannot be reduced to take advantages of the significantly stronger electric field closer to the central electrode.

EOSPACE Invention Technique (1)

Instead of a conventional MZ interferometer waveguide structure in which the two waveguide pair in the middle section must have a large spacing between them to avoid optical coupling, EOSPACE basic invention is to use an optical waveguide interferometer circuit in which the waveguide pair in the middle section has a much smaller spacing, so that the positions of each of waveguides are now much closer to the central electrode. This closer proximity of the waveguides to the central electrode leads to a much higher electro-optic interaction due to enhancement in the electric field inside the waveguide pair.

However, without other additional adjustments, the waveguide pair with a much smaller spacing are optically coupled and results in a significant degradation with poor depth of modulation in the modulator transmission function with respect to an applied voltage (Electric field).

To solve this issue, EOSPACE offers several invention techniques to solve this degradation of this "coupled-waveguide" interferometer modulator's response function, and effectively restores the response to that of a typical optically-uncoupled MZ modulator, while maintaining the higher modulator's efficiency owing to the enhanced electric field inside the waveguide pair which are much closer to the peak field near the central electrode.

The first invention technique is to use a coupled-waveguide interferometer structure 10 with one or multiple sections 12 of asymmetric $\Delta n$-waveguide pairs 14 in the coupling region. A basic device structure is illustrated schematically in FIG. 2.

This interferometric coupled-waveguide structure 10 allows the use of much smaller waveguide-waveguide spacing G2 in the middle electro-optic interaction region 18 as compared to a much larger spacing G1 for that of a conventional MZ device with un-coupled waveguides shown in FIG. 1.

With the smaller waveguide spacing, the waveguides are much closer to the edges of the central electrode 16, where the electric fields are much higher inside the waveguide pair. This leads to an improvement of the electro-optic interaction efficiency.

For a MZ interferometer device with a uniform waveguide pair, when the spacing between the waveguides is reduced, the two optical waveguides are optically-coupled via evanescent field coupling. Unfortunately, the coupling will result in a degradation of the optical transfer characteristics.

Figure 2:
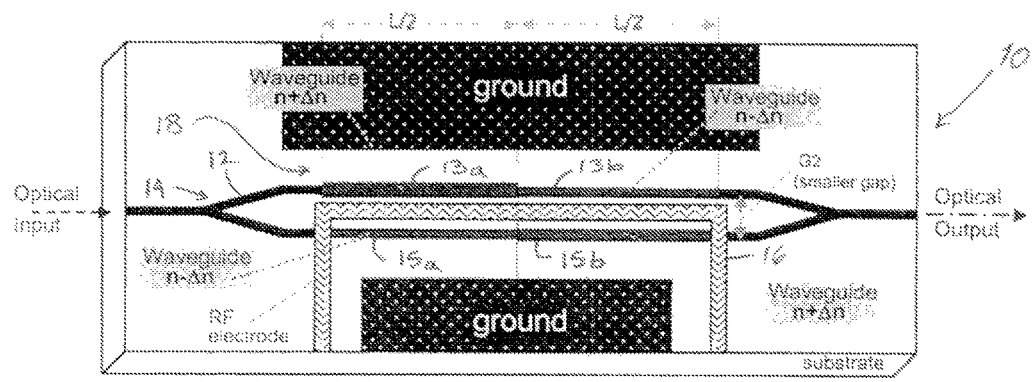
FIG. 2 is schematic illustration of a coupled-waveguide interferometer structure with sections of asymmetric Δn waveguide pairs in the middle section of an interferometric waveguide structure.

In this invention, instead of using a symmetrically uniform waveguide pair in which the two waveguides are similar, an asymmetric (dissimilar) waveguide pair is used. As illustrated in FIG. 2, the two waveguides have different waveguide indices ($n \pm \Delta n$), where "n"—corresponds to the effective waveguide index. The effective waveguide index of the upper waveguide arm 13 ($n_{upper-arm}$) is not the same as the waveguide index of the lower waveguide arm 15 ($n_{Lower-arm}$). The use of this asymmetric waveguides is to essentially de-couple the waveguide pair. In general, multiple sections of these asymmetric waveguide pairs, with a reversal of the two indices from one section to the next can be used to eliminate optical chirp as illustrated in an example in FIG. 2 above with a basic 2-section construction.

The asymmetric $\Delta n$ waveguide pair can be realized by several means including:

a) Using a different-width waveguide pair. Different waveguide widths will lead to different effective waveguide indices.

b) Using different waveguide fabrication/design parameters. For example, with Titanium in-diffused LiNbO$_3$ waveguides, by changing the thickness of the initial Titanium film between the two waveguides, one can create waveguides with different effective waveguide indices.

c) Using any other techniques that lead to an asymmetric $\Delta n$ waveguide pair, such as using different dielectric loading, different applied static voltage, different waveguide material, etc.

The effect of an asymmetric $\Delta n$ waveguide pair in a coupled waveguide structure is a change in the differential ($\Delta \beta$) propagation constant between the coupled waveguide pair. The effect is equivalent to a differential applied static voltage to each section. The optical transmission characteristics as a function of a normalized applied voltage can be calculated.

Figure 3A:
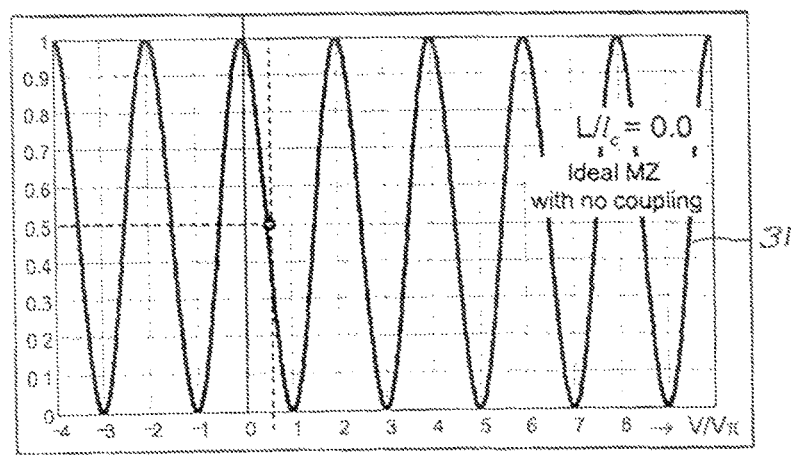
FIG. 3a is a plot of optical transmission characteristics vs. normalized applied voltages for a conventional MZ interferometer in which the waveguide pair is not optically coupled.
Figure 3B:
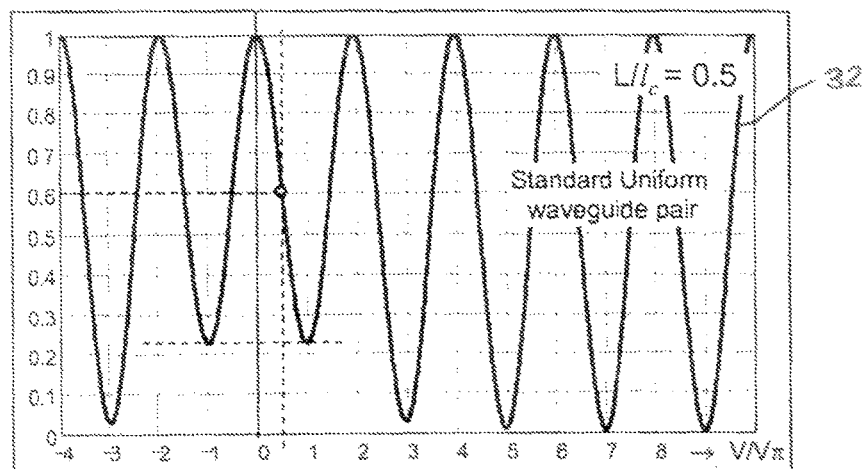
FIG. 3b is a plot of optical transmission characteristics vs. normalized applied voltages for a device where the waveguides are optically coupled (equivalent to a strong coupling of L/lc=0.5). The two waveguides are similar uniform waveguides.
Figure 3C:
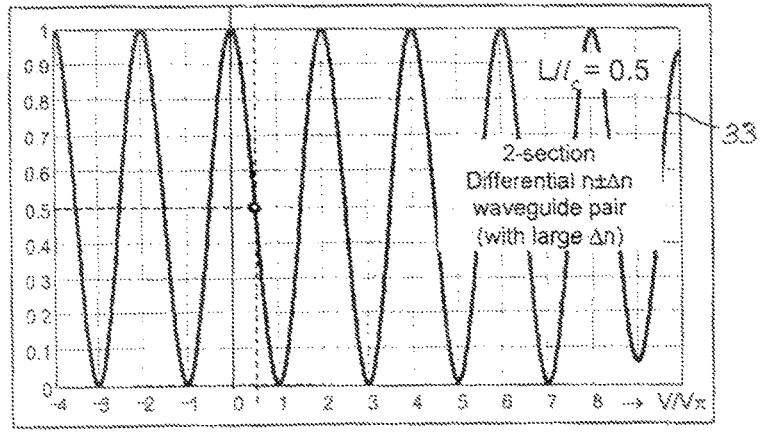
FIG. 3c is a plot of optical transmission characteristics vs. normalized applied voltages for a device where waveguides are optically coupled (equivalent to a strong coupling of L/lc=0.5). However, the two waveguides are dissimilar, with 2 sections of large asymmetric Δn

FIGS. 3a, 3b and 3c show plots of calculated optical transmission characteristics vs. normalized applied voltages for three different devices.

The plot in FIG. 3a shows the calculated response of a conventional MZ waveguide modulator with uncoupled waveguide pair. The response is sinusoidal as expected for an optical interferometer.

The plot in FIG. 3b shows the calculated response of a device with a strongly-coupled waveguide pair, with similar uniform waveguides. As an example, the plot in FIG. 3b is calculated for the case in which the optical coupling between the waveguide pair is equivalent to $L/l_c=0.5$. The response shows a significant degradation, particularly at the typical operating point near zero-voltage bias, $V/V_\pi \sim \pm \frac{1}{2}$. The extinction ratio ("peak" to "null") is very poor and unusable for most typical applications. In addition, the modulation (slope) efficiency is also significantly degraded.

The plot in FIG. 3c shows the calculated response of a device with a strongly-coupled waveguide pair, (equivalent to $L/l_c=0.5$), but with an asymmetric $\Delta n$ waveguide pair 14, as shown in FIG. 2 with two-sections 13a, 13b and 15a, 15b. The asymmetric $\Delta n$ waveguides are reversed from one section to the next. In this specific case, the transfer characteristic is calculated for an asymmetric $\Delta n$ waveguide pair, equivalent to the effect of applied static voltages of $V/V_\pi \sim \pm 11$.

As can be clearly seen, the transmission function of this two-section asymmetric $\Delta n$ waveguide pair with large enough $\Delta n$ is now similar to that of the conventional MZ interferometer, particularly at the typical operating point near zero voltage with full "peak-null" swing and modulator "slope" efficiency. The use of asymmetric waveguide pair with a large enough $\Delta n$ effectively de-couples the waveguide pair, leading to a similar transmission characteristics that of a conventional MZ interferometer modulator, but with an improved modulation efficiency.

Benefit:

a) Since the spacing between the waveguide pair 14 in this coupled-waveguide interferometer structure with asymmetric Δn waveguide pair 13, 15 is significantly smaller than that of the MZ device, the electrical field is much stronger inside the waveguide pair, leading to a significantly lower $V_\pi$.

In general, a large asymmetric Δn should be used to effectively compensate the effect of the coupling, eliminating the degradation of the transfer characteristics near the typical operating point near zero.

b) By using two equal-length sections of asymmetric waveguide pairs (with reversed Δn between the two sections), any potential chirp due to any slight asymmetry in the electro-optic induced change in the indices between the two asymmetric waveguide pairs can be eliminated, resulting in chirp-free operation.

c) If chirp-free operation is desired for much broader bandwidth, the effect of the electrical signal propagation loss as the signal propagates down the transmission-line electrode as a function of RF frequency has to be taken into account. By using multiple sections of asymmetric Δn waveguide pair with reversed Δn between sections and with proper sectional lengths, the effect of electrical signal propagation loss down the transmission-line can be compensated for higher frequency operation.

Figure 4:
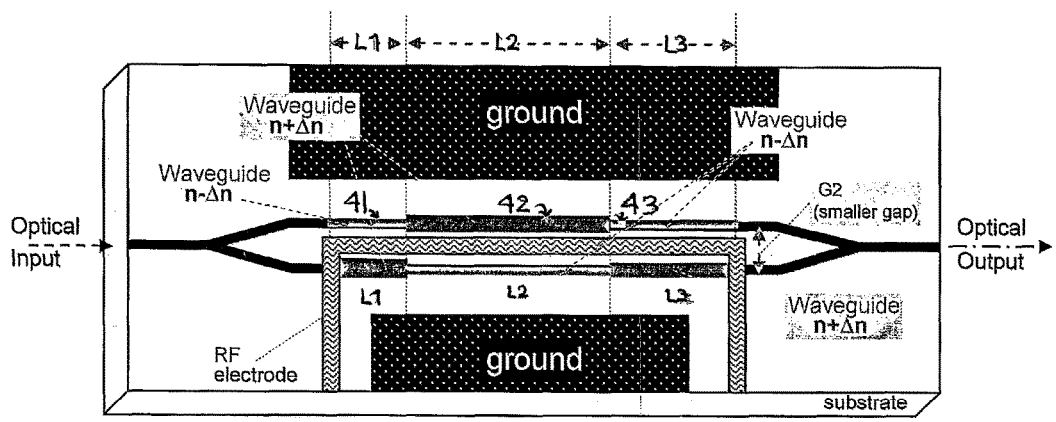
FIG. 4 is a schematic illustration of a coupled-waveguide interferometer with three sections of alternate-Δn asymmetric waveguide pairs with different sectional lengths.

FIG. 4 shows an example of a coupled-waveguide interferometer 40 with three sections of alternate asymmetric Δn waveguide pairs, with a front section 41 with length $L_1$, followed by section 42 of length $L_2$ with a polarity reversal in Δn, followed by section 43 with length $L_3$ with the same Δn polarity as in section 41.

For example, at very low frequencies near DC, the electrode loss should be negligible. And therefore, if sectional length $L_2=L_1+L_3$ combined, the overall electro-optically induced should be equal on both arms leading to an overall zero-chirp operation at low frequencies.

At some high frequency such as 10 GHz, there is some electric signal loss propagating down the transmission line. If the average effective electrical fields generated by each electrode section are $E_1$, $E_2$ and $E_3$ respectively. In general, $E_1$ should be highest, followed by $E_2$ and $E_3$ due to propagation loss. By using a proper ratio of $L_1$, $L_2$ and $L_3$, one should be able to achieve equal cumulative electro-optic interaction (i.e. Electric field×Interaction length) between the alternate-Δn sections, so that $E_2 \cdot L_2 = E_1 \cdot L_1 + E_3 \cdot L_3$ at higher frequency, which provides a chirp-free operation at 10 GHz as well as low frequency. A larger number of sections can be used, if needed.

EOSPACE Invention Technique (2)

Figure 5A:
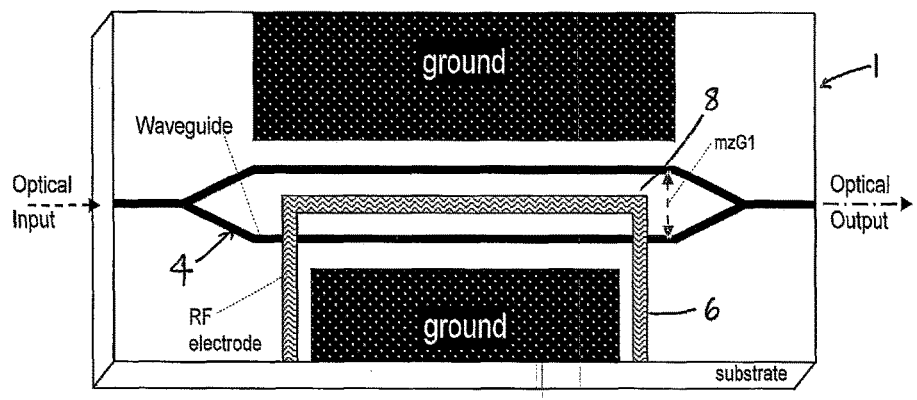
FIG. 5a is a schematic illustration of an MZ Interferometer-type waveguide modulator based on X-cut Y-propagation $LiNbO_3$ with traveling-wave electrode.
Figure 5B:
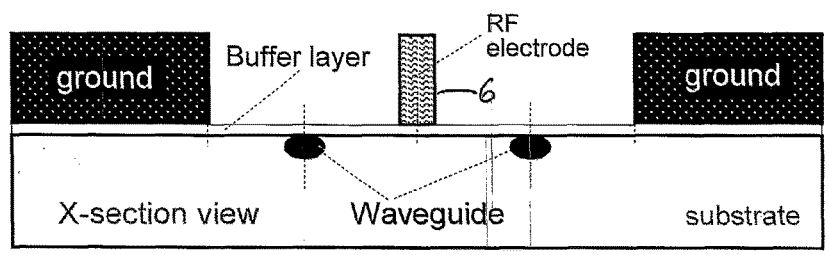
FIG. 5b is a cross-section view of an MZ Interferometer-type waveguide modulator based on X-cut Y-propagation $LiNbO_3$ with traveling-wave electrode.

A conventional traveling-wave MZ modulator on X-cut $LiNbO_3$ waveguide structure 1 as shown in FIGS. 5a and 5b has a transmission-line electrode structure 6 symmetrically located between the interferometer waveguide pair 4 to achieve chirp-free operation. The efficiency of a MZ waveguide modulator is limited by the fact that the MZ waveguide pair has to be sufficiently separated to avoid optical coupling, which leads to unacceptable degradation in the optical transmission characteristics. Because of this required large waveguide separation; in general, the waveguides are not close to the edge of the central electrode where the E-field peaks 8 are located, and therefore electro-optic interaction efficiency is compromised.

This second technique of the invention describes the use of modified transmission-line electrode structure 50 as shown schematically in FIGS. 6a, 6b, and 6c. The central electrode 56 of the CPW transmission-line is designed to weave around the waveguide pair 54 so that the central electrode 56 is closer to one of the waveguides 52 alternately in multiple sections, so that the waveguide closer to the central electrode sees the maximum electric field 58 near the edge of the central electrode.

Figure 7A:
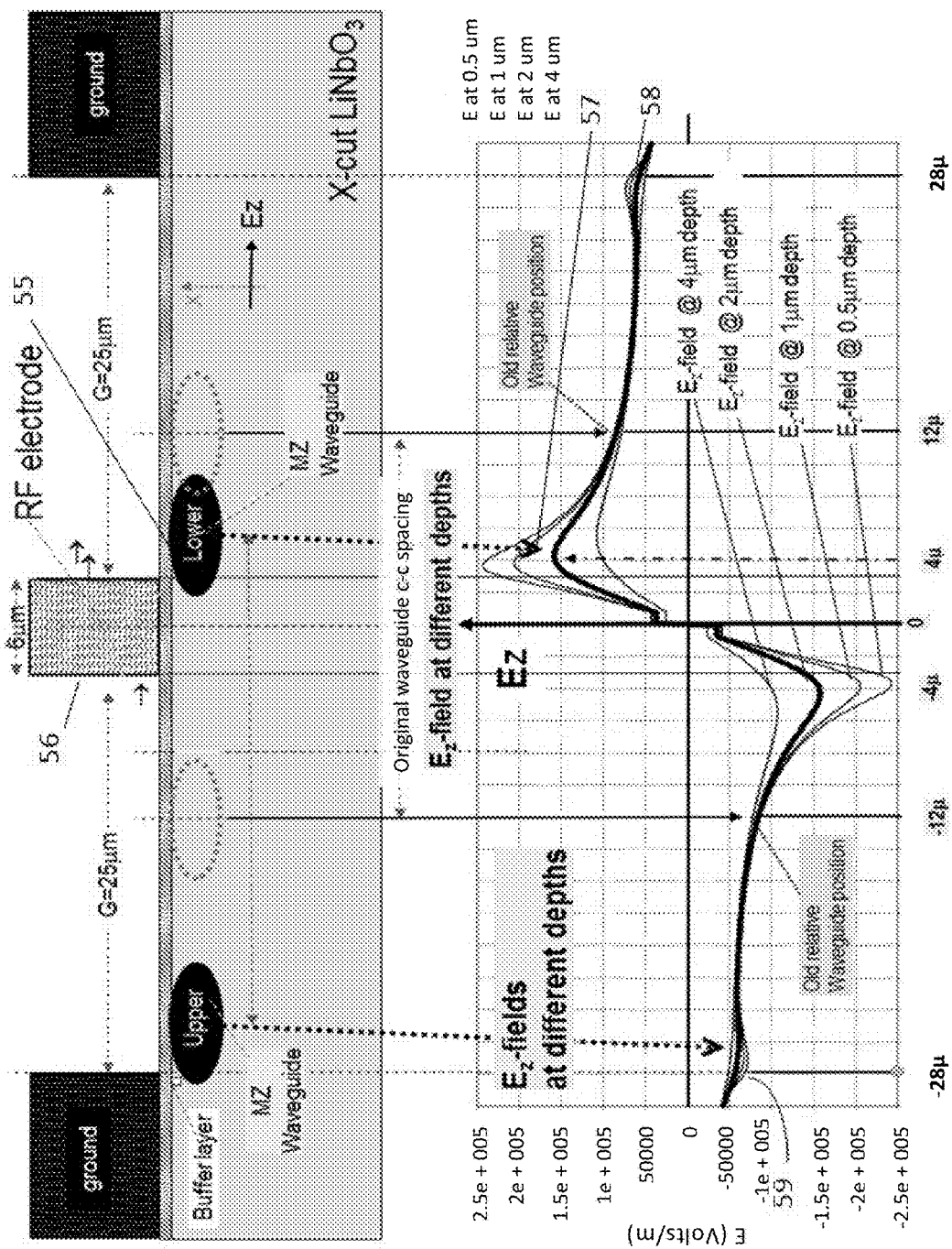
FIG. 7a is a plot of electric field interaction with one waveguide closer to the edge of the electrode.
Figure 7B:
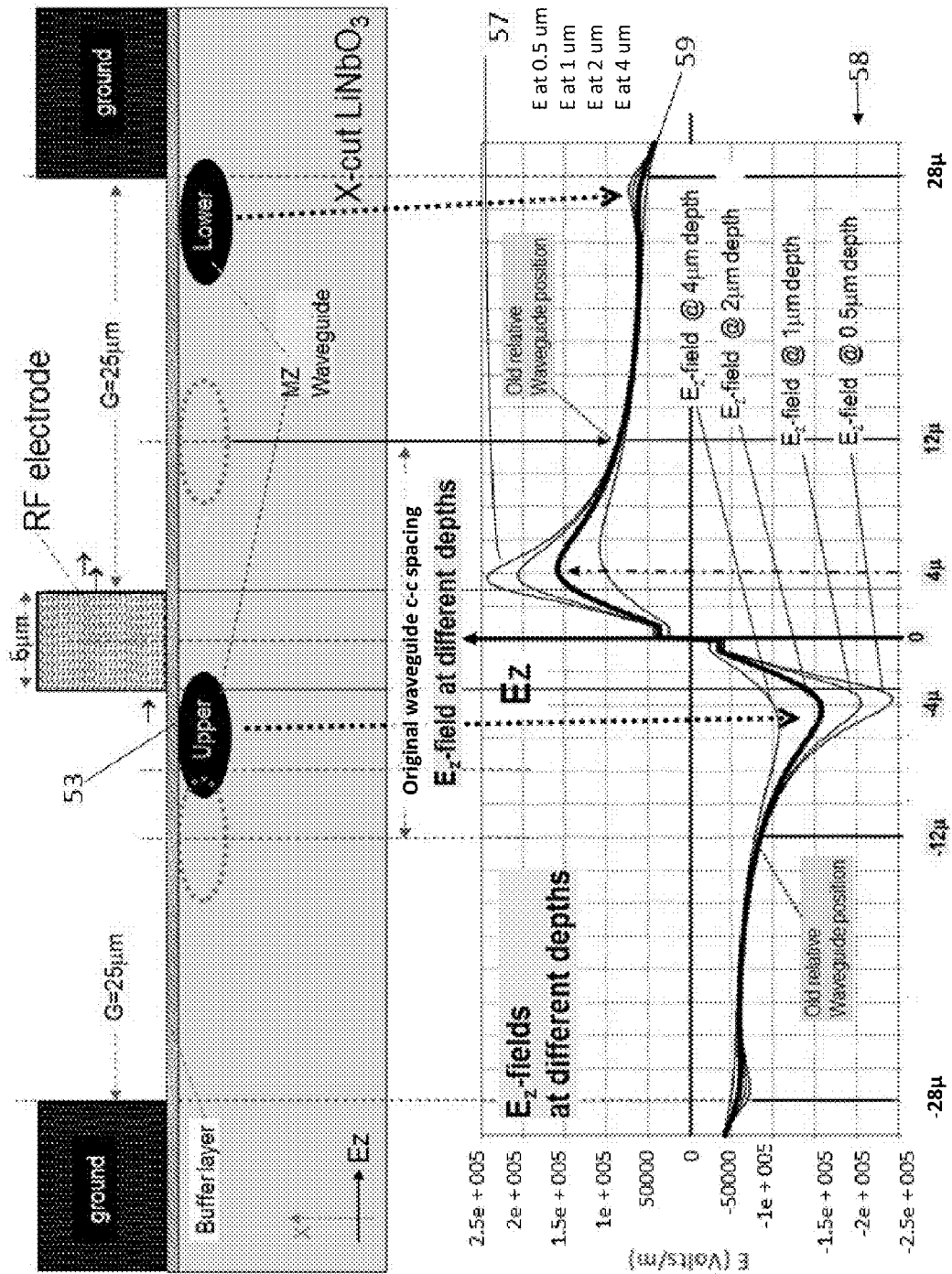
FIG. 7b is a plot of electric field interaction with a second waveguide closer to the edge of the electrode.

The increase in the electric field interaction with waveguide 55, 53 closer the edge of the electrode is illustrated in FIGS. 7a and 7b.

This electrode/waveguide arrangement should allow an increase in the overall electro-optic interaction efficiency. Note that the other waveguide can also be arranged to take advantage of the higher local field near the edge of the ground electrode as well.

Since one of the waveguides will see stronger electro-optic interaction than the other, the sectional lengths should be properly selected to achieve chirp-free operation. For example, using a three-section construct as shown in FIG. 6, the lengths $L_1$, $L_2$, $L_3$ can be chosen to achieve low chirp operation, same as described in the previous section.

At very low frequencies near DC, the electrode loss should be negligible. And therefore, if sectional length $L_2=L_1+L_3$ combined, the overall electro-optically induced index change should be equal on both arms, leading to an overall zero-chirp operation at low frequencies. At some high frequency (such as 10 GHz), there is some electric signal loss propagating down the transmission line. The average effective electrical fields generated by each electrode section are $E_1$, $E_2$ and $E_3$ respectively. In general, $E_1$ should be highest, followed by $E_2$ and $E_3$ due to propagation loss. By creating a proper ratio of $L_1$, $L_2$ and $L_3$, one should be able to achieve equal cumulative electro-optic interaction (i.e. Electric field×Interaction length) between the two alternate-Δn sections, so that $E_2 \cdot L_2 = E_1 \cdot L_1 + E_3 \cdot L_3$, which results in chirp-free operation at 10 GHz as well as at low frequency. By achieving equal accumulative electro-optic interaction, any potential chirp due to any slight asymmetry in the electro-optic induced change in the indices between the two asymmetric waveguide pairs can be eliminated, resulting in chirp-free operation. A larger number of sections can be used, if needed.

EOSPACE Invention Technique (3)

Figure 8D:
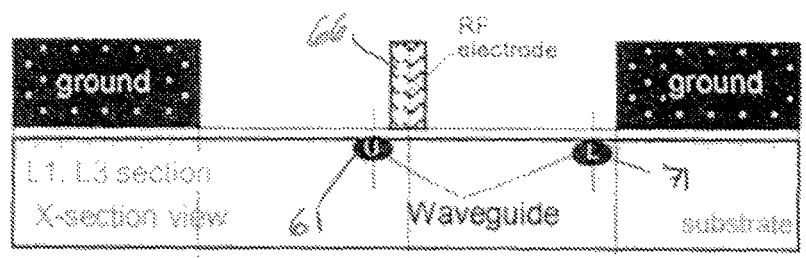
FIG. 8d is a cross-section of sections $L_1$ and $L_3$ of an MZ modulator using a modified waveguide structure in which the waveguide pair weaves back and forth around the CPW transmission-line electrode.
Figure 8E:
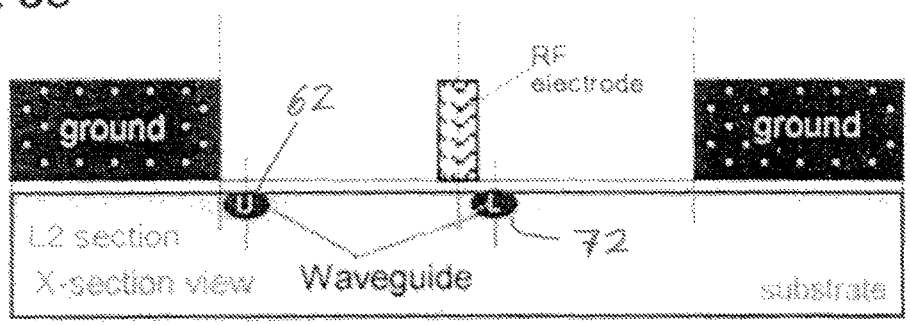
FIG. 8e is a cross-section of section $L_2$ of an MZ modulator using a modified waveguide structure in which the waveguide pair weaves back and forth around the CPW transmission-line electrode.

To increase the efficiency of the overall MZ waveguide modulator, another technique of the invention is to modify the MZ waveguide pair 64 as shown in FIG. 8. The interferometric waveguide pair 64 can be designed so that one of the waveguides 63 is closer to the edge of the central CPW transmission-line electrode 66 section to achieve the benefit of the higher E-field near the edge of the central electrode 66, alternately in sections. The lengths of these alternate sections 61, 62, 63, 71, 72, 73 follow the same discussion as previous sections to achieve low-chirp modulator operation.

EOSPACE Invention Technique (4)

Figure 9:
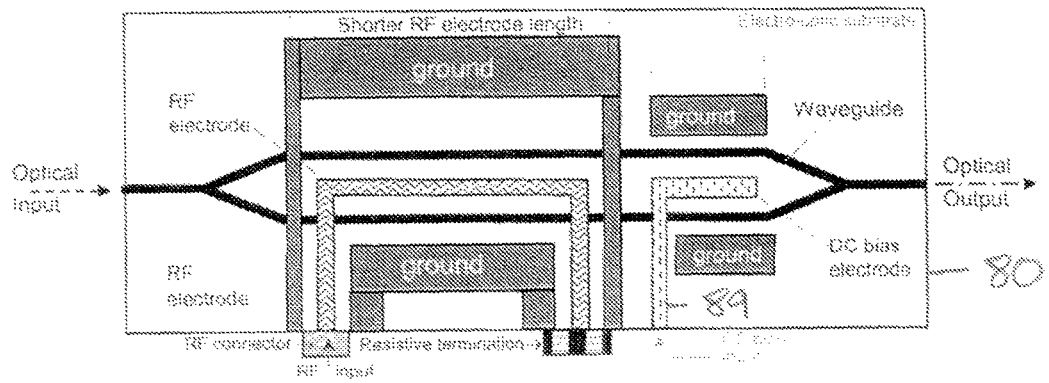
FIG. 9 is a schematic illustration of a typical MZ modulator with one broadband transmission-line electrode with matched resistive termination and one DC electrode for setting the operating point.

The optical modulator efficiency also depends on the electrode interaction length. For broadband bandwidth operation, a traveling-wave transmission-line electrode with matched resistive termination is used. In general, the transmission-line electrode is designed to closely match the impedance of a typical high-frequency RF drive system (nominally at 50 ohm). The operating point of the modulator has to be set at a particular point, which may need to be adjusted as a function of the environment (such as temperature), as well as other factors. In general, an additional DC electrode 89 section is added to provide operating point adjustment by applying a DC voltage as shown in FIG. 9.

The real estate on an electro-optic chip 80 can be limited and the need for a DC electrode 89 means that the "signal" transmission-line electrode 86 length is limited for a given chip length. This results in a higher drive voltage, i.e. lower conversion efficiency.

Figure 10:
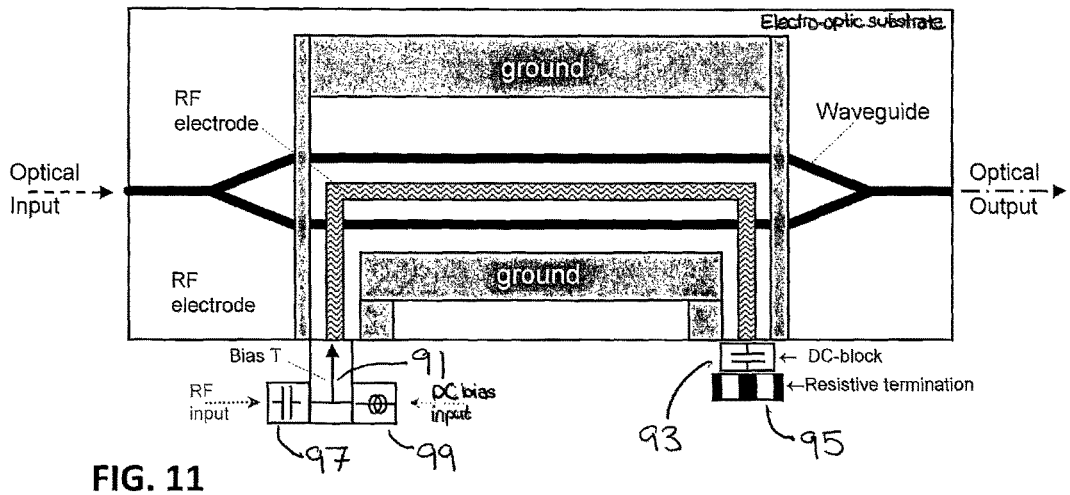
FIG. 10 is a schematic illustration of a modulator using a common electrode for RF signal & DC bias.

In order to use a longer transmission-line electrode to lower the drive voltage, the separated DC electrode can be eliminated. In this case, a DC voltage 91 is needed to be applied to the common transmission-line electrode 96 (to set the operating point) as shown in FIG. 10. In practice, a capacitor chip 93 (or DC-block) will be needed to prevent DC current to flow through the resistive termination chip 95 (to avoid DC power drain, as well as to limit DC current and heat in the termination resistor which has electrical power handling limitations.) In addition, a microwave Bias Tee 97 is needed at the input to combine the DC bias voltage 98 and the RF data signal 99, as well as to prevent DC power from reaching the RF source. However, a microwave Bias Tee adds RF insertion loss as well as extra cost and size to the modulator. The microwave Bias Tee also introduces a low frequency cut-off as well, since the DC and lower frequency end of the data signal will be blocked by the Bias Tee.

Figure 11:
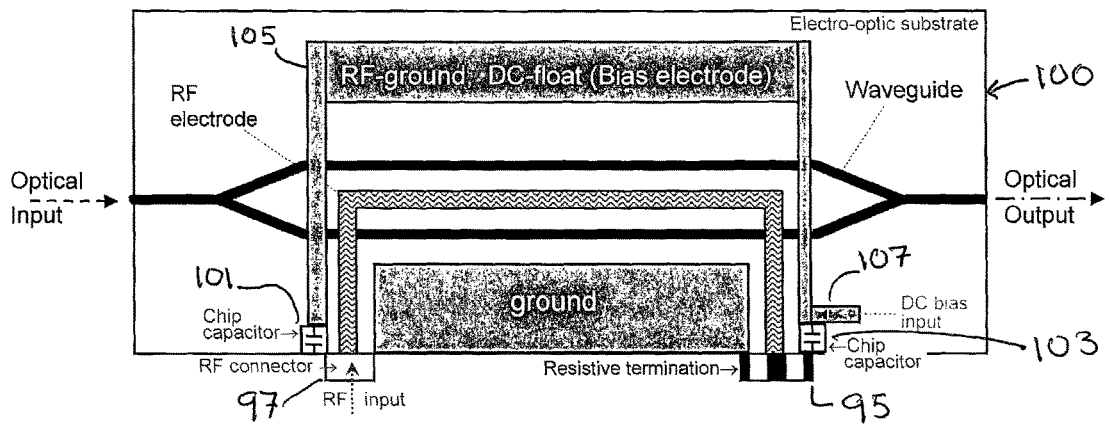
FIG. 11 is a schematic illustration combining RF and DC bias using one single transmission-line electrode and using chip capacitors in one or both of the ground electrodes.

The EOSPACE new invention technique to increase the modulator efficiency by using one common long electrode structure for both RF signal and DC bias is shown schematically in FIG. 11. The implementation uses chip capacitors 101, 103 in one or both of the ground electrodes 105.

Small-size chip capacitors are integrated onto the modulator chip 100 in one or both of the ground electrodes, instead of the central electrode. The ground electrode structure with chip capacitors will now behave as a DC-float structure, while conducting as RF ground, since the chip capacitors act as a short to the RF signal. A DC bias voltage 107 can be applied to the floating DC ground electrode 105 to set the operating point. The RF data signal can be applied directly to the device without an additional microwave bias Tee.

Figure 12:
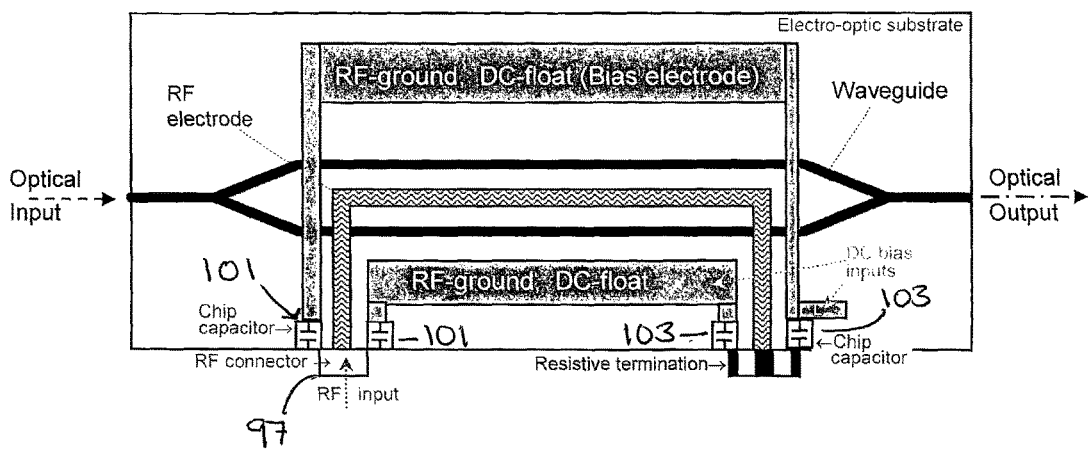
FIG. 12 is a schematic illustration combining RF and DC bias using one single transmission-line electrode to use chip capacitors in both of the ground electrodes.

Chip capacitors 101, 103 can be applied to both grounds to create a more symmetric structure, as shown in FIG. 12, as well as lower the required DC voltage bias to set the operating point.

EOSPACE Invention Technique (5)

Figure 13A:
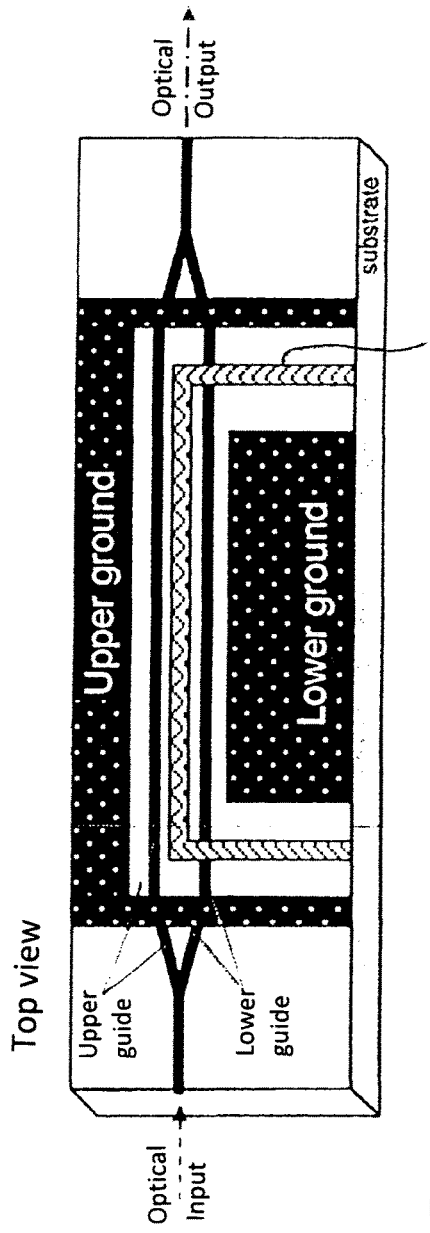
FIG. 13a is a schematic illustration of an MZ interferometer type waveguide modulator with X-cut Y propagation $LiNbO_3$.
Figure 13B:
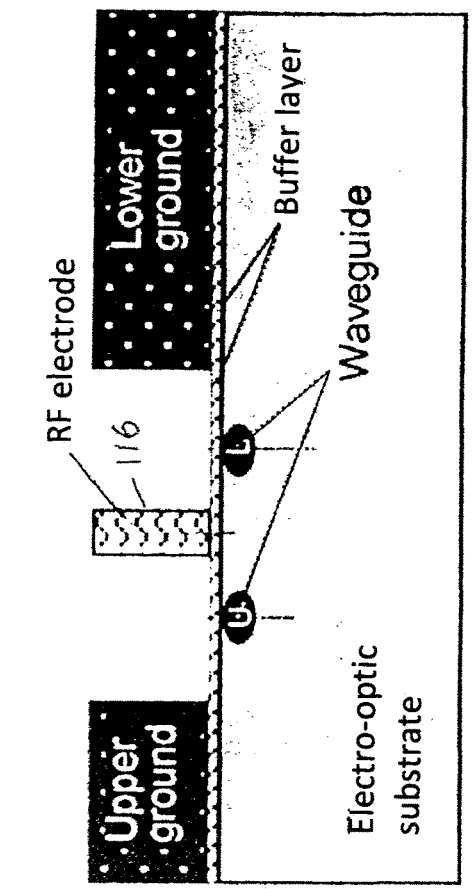
FIG. 13b is a cross-section of an MZ interferometer type waveguide modulator with X-cut Y propagation $LiNbO_3$.

The most widely used conventional optical modulator is a traveling-wave X-cut $LiNbO_3$ waveguide modulator shown schematically in FIGS. 13a and 13b. A typical CPW transmission-line electrode has a large electrode gap between the central electrode 116 and grounds (ranging from ~20 μm to >50 μm), relative to a typical waveguide depth (well below 10 μm).

The electric fields extend deeper into the $LiNbO_3$ than is required for efficient interaction with the lightwave propagating inside the optical waveguides. These E-fields are in $LiNbO_3$, a material with a very high-dielectric constant. It has been shown that a higher efficiency modulator can be achieved if the $LiNbO_3$ substrate is thinned. See for example, "High-Speed and Low-Driving-Voltage Thin-Sheet X-Cut $LiNbO_3$ Modulator With Laminated Low-Dielectric-Constant Adhesive", Jungo Kondo, et. Al., IEEE PHOTONICS TECHNOLOGY LETTERS, Vol. 17, No. 10, October 2005. However, the current techniques of using optical polishing, chemical or laser etching techniques and etc. to achieve such as very thin substrate are very elaborate and difficult to control to achieve very thin substrates without breaking the samples. Those techniques lead to very low yields and therefore may not be practical for mass production products.

Figure 14A:
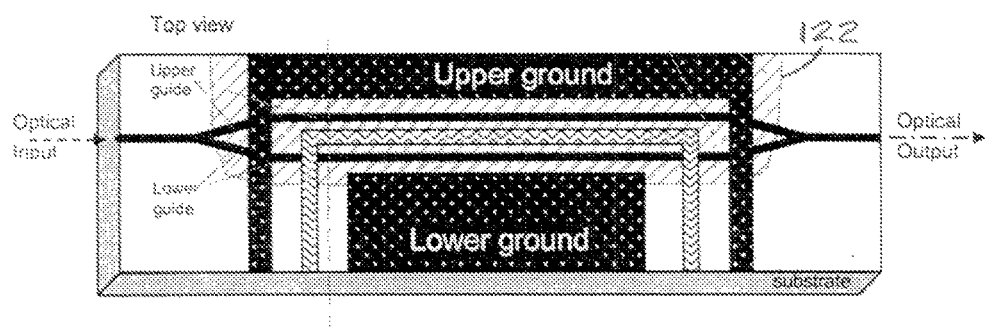
FIG. 14a is a schematic illustration of using a high precision dicing saw to create an effectively ultra-thin substrate to increase the electro-optic interaction efficiency and eliminate RF response drop-off due to RF coupling to substrate mode at the RF launch.
Figure 14B:
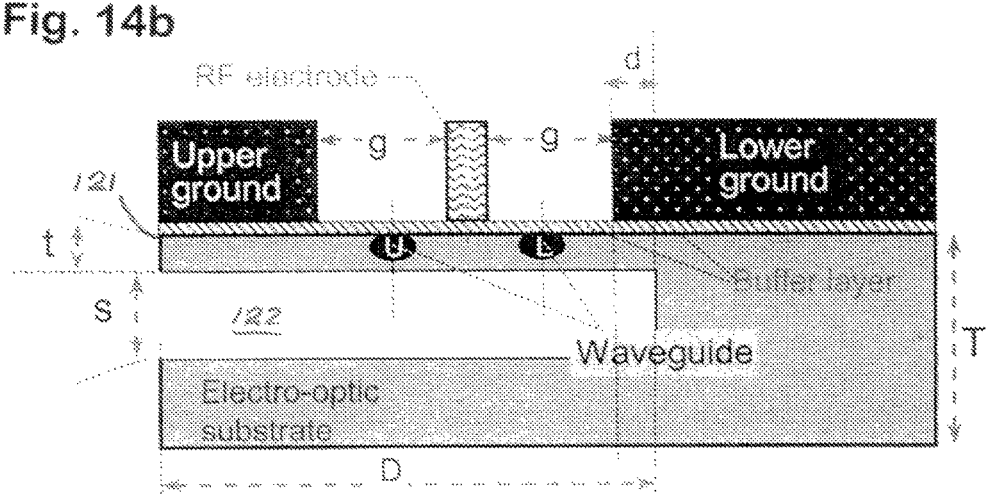
FIG. 14b is a cross-section view of using a high precision dicing saw to create an effectively ultra-thin substrate to increase the electro-optic interaction efficiency and eliminate RF response drop-off due to RF coupling to substrate mode at the RF launch.

The EOSPACE invention technique to solve this issue is shown schematically in FIGS. 14a and 14b. First of all, the waveguide modulator is to be fabricated so that the entire structure is closer to one of the long edge of the chip, for example, the upper edge as illustrated in FIG. 14. The modulator chip can then be put on its side and a high-precision dicing saw can be used to cut a slot 122 underneath the waveguide device from the side edge as shown to create a slot underneath the MZ waveguide pair and the CPW electrode.

EOSPACE has used this high-precision dicing saw-cutting technique to produce a very thin ridge structure in $LiNbO_3$ substrate with a very long ridge structure (several centimeters long) with ridge width <10 μm, and ridge height of several hundred microns. Therefore, using this side-cut technique, a structure can be created as shown in figures, with an effectively very thin ~10 μm substrate only underneath the waveguide modulator electrode interaction area, without having to lap down the whole chip with all the benefits of designing a higher efficiency modulator.

The use of a high precision dicing saw to side-cut the substrate to effectively achieve an ultra thin substrate 121 also allows an optical modular device to operate at much higher RF frequencies towards 100 GHz, by eliminating RF coupling to the substrate mode at the RF launch, an issue that currently limits the high frequency operation of $LiNbO_3$ modulators with "un-thinned" substrates (>500 μm). A standard $LiNbO_3$ substrate ~500 μm thick, is thinned down substantially to eliminate RF response drop-offs due to RF coupling into substrate modes.

The slot area underneath substrate 121 surface, under MZ waveguides/electrodes, can be an air gap or it can be refilled with a low-loss, low dielectric material 122.

The use of a high precision dicing saw side-cuts the substrate 121 effectively achieves an ultra thin substrate instead of using conventional wafer thinning techniques such as lapping, etching, etc. The invention should significantly increase fabrication yield, as well as simplify processing steps leading to lower cost.

Background Discussion on an Electro-Optical Waveguide Interferometer-Type Modulator.

An optical modulator is a device that converts an electrical data signal into an optical signal so that (analog or digital) data can be transmitted optically via a low-loss fiber-optic transmission-line or free space propagation.

The most widely used wide-bandwidth modulator is based an electro-optic singlemode waveguide modulator fabricated on an electro-optic substrate. An electro-optical waveguide modulator such as fabricated on electro-optic material such as Lithium Niobate, semiconductor, polymer, etc., is highly-efficient, due to the tightly-confined light inside the optical waveguide and the electrode structure located in very close proximity to the optical waveguide circuit. When a voltage is applied to the electrode, an associated electric field is generated inside the optical waveguide and induces an optical modulation (via a change in the optical index induced by electro-optic interaction). To achieve very large bandwidth of operation (tens of GHz), a "traveling-wave" transmission-line electrode structure is typically used. This transmission-line electrode is typically designed so that the electrical modulating signal co-propagates (in the same direction) as the lightwave signal (propagating along the optical waveguide) with closely-matched propagation speed to maximize the electro-optic interaction. The characteristic impedance of the transmission-line electrode is typically designed to closely match the driver impedance (typical 50 ohm).

Figure 15A:
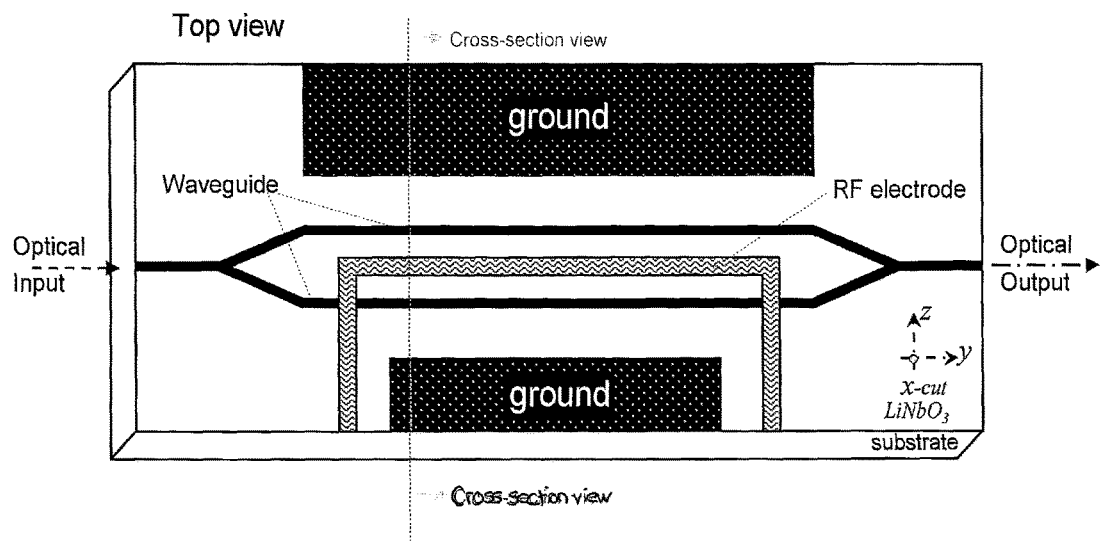
FIG. 15a is an X-cut $LiNbO_3$ waveguide modulator in top view.
Figure 15B:
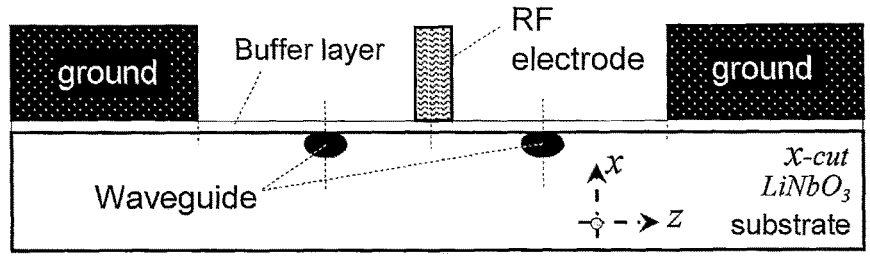
FIG. 15b is an X-cut $LiNbO_3$ waveguide modulator in cross-section view across the MZ waveguide pair.

As a prime example, the most common broadband traveling-wave optical waveguide modulator is based on a device that is fabricated in the form of an optical waveguide circuit on the surface of an electro-optic Lithium Niobate (LiNbO$_3$) substrate. The most common LiNbO$_3$ waveguide modulator structure is the Mach Zehnder (MZ) interferometer intensity modulator. FIGS. 15a and 15b shows a schematic diagram of one of the most common X-cut Y-propagation LiNbO$_3$ waveguide intensity MZ modulators with a CPW (Coplanar waveguide) traveling-wave transmission-line electrode structure. An X-cut LiNbO$_3$ modulator has a symmetric electrode layout with respect to the waveguide circuit.

The MZ waveguide circuit consists of a single mode input waveguide that branches out at a y-junction to a pair of waveguides in the middle section and the two waveguides are then recombined back to a single mode waveguide at the output end. By incorporating an electrode structure in the middle section, in close proximity to the waveguide pair, a voltage can be applied to generate an electrical field inside the two MZ waveguides with opposite polarity. The two opposite electrical fields interact with the two light signals propagating inside the waveguide pair, via the electro-optic effect. The result is an induced differential change in the optical waveguide indices between the two light paths, which in turn, results in a differential phase optical shift between the two light signals. The two lights interfere at the output Y-junction. If the two lights are in-phase, they recombine constructively, resulting in maximum output at the single mode waveguide output. If the two lights are out-of-phase, for example 180° out-of-phase, they interfere "destructively", resulting in the generation of a 2nd order mode which is not supported by the single mode output waveguide, and the output light at the output guide is at a minimum. And thus, by applying a voltage to the electrode, one can control the output intensity of light.

Owing to the symmetric arrangement of the electrode with respect to the MZ waveguide pair, the electro-optical induced phase changes are equal in magnitude but opposite in sign, between the two MZ optical path, and the overall result is an intensity modulation with no associated phase shift, i.e. no chirp (or Chirp-free) operation.

To achieve maximum operation bandwidth and efficiency, a traveling-wave transmission-line electrode structure is used. The transmission-line is designed so that the RF signal propagation speed matches to that of the light signal propagation speed to achieve maximum interaction. The transmission line is also typically designed to match the standard 50 ohm RF drive system. The most common transmission-line electrode is the CPW (Coplanar waveguide) structure, with one central electrode and two grounds as shown in the FIGS. 14a and 14b.

The key performance parameters of an optical modulator are the optical insertion loss, the bandwidth and the electro-optic conversion efficiency. The efficiency of a MZ intensity modulator is typically expressed by the figure of merit ($V_\pi$), which is the voltage required to switch the light from "peak"—maximum transmission to "null"—minimum transmission. ($V_\pi$ corresponds to the voltage required to electro-optically induced a π-differential phase shift between the MZ waveguide pair).

Currently, this type of conventional electro-optic modulator structures are not fully optimized for maximum modulation efficiency.

There is always a need to improve the modulation efficiency of an optical modulator. Optical waveguide structures suitable for single mode operation and compatibility with single mode optical fiber typically have very small dimensions (<10 µm). To match the size of the waveguide structure, the electrical transmission-line electrode structure also must be designed with small dimensions.

LiNbO$_3$ is a high dielectric material and therefore the CPW Transmission-line electrode is typically designed with a small-width center electrode to achieve higher impedance (close to 50 ohm), as well as to achieve the velocity matching condition between the electrical and light signals for maximum bandwidth of operation.

Figure 16:
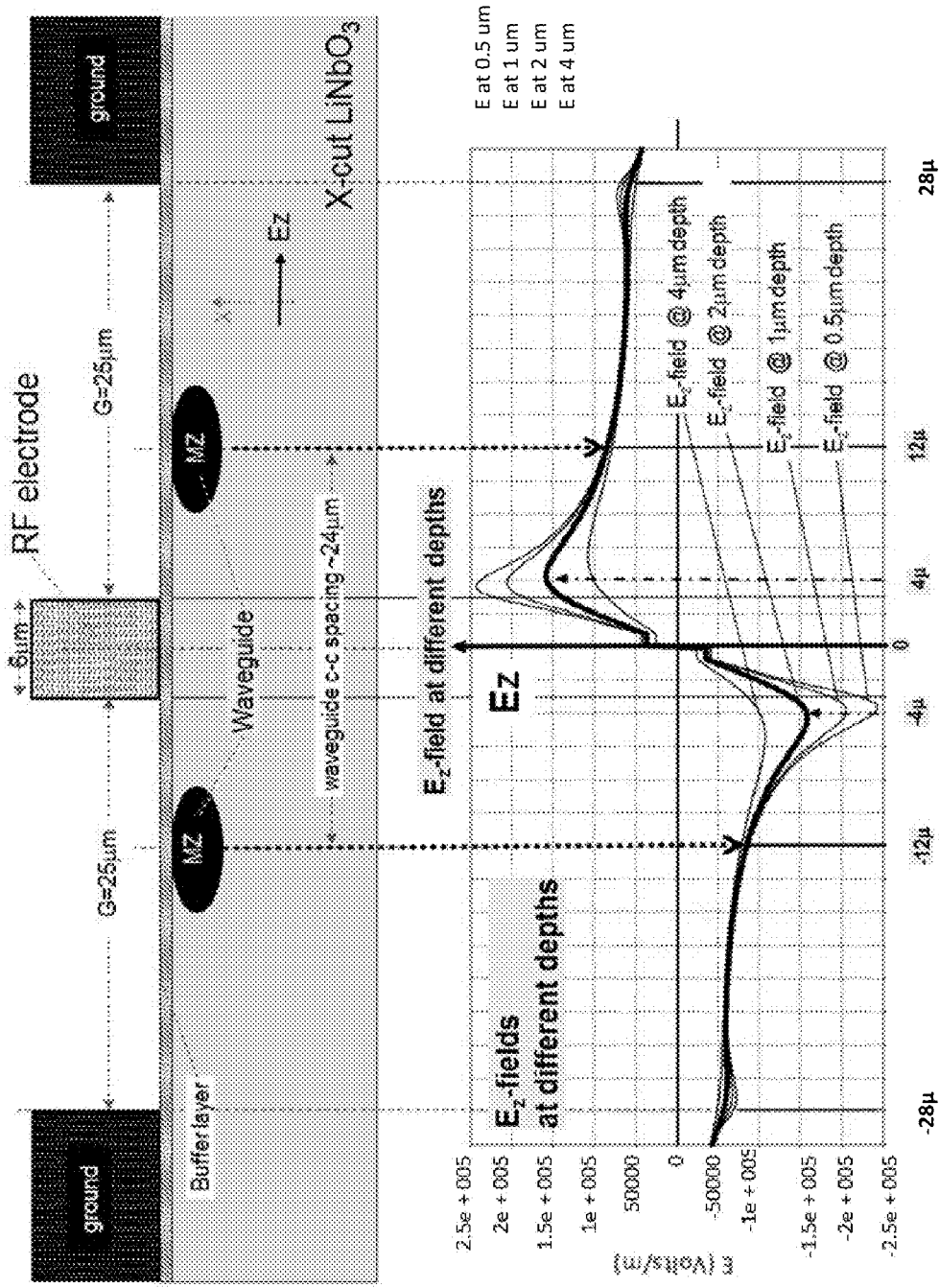
FIG. 16 is a cross-section view of a typical X-cut $LiNbO_3$ modulator, and the horizontal $E_z$-electrical field profile inside the $LiNbO_3$ substrate at various depths from the surface.

A cross-section view (across the MZ waveguide pair) of an X-cut LiNbO$_3$ MZ Intensity modulator with a typical design parameter set is shown in FIG. 16. For clarity, described is an X-cut device with typical device parameters in the following discussion.

The CPW transmission-line has a ~6 µm-wide center electrode and ~25 µm gap. With a typical thickness (0.5-1.2 µm) of a dielectric layer (such as silicon dioxide) between the electrode and the substrate, the thickness of the electrode is chosen to achieve RF signal propagation speed to match that of the optical signal propagating inside the optical waveguide and an electrode impedance near 50 ohm.

To achieve maximum electro-optic interaction, both the applied electric field and the optical polarization mode inside the optical waveguides should be aligned along the optical Z-axis of the LiNbO$_3$ substrate, so as to use the strongest $r_{33}$ linear electro-optic interaction.

For an X-cut Y-propagating waveguide device, the light should be TE-polarized and the horizontal $E_Z$-field inside the waveguide should be maximized. A typical optical waveguide depth is <4 µm (for λ~1.5 µm). For maximum electro-optic interaction, the electric field inside the waveguide should be maximized. Plots of the calculated Horizontal Electric ($E_Z$) fields generated underneath the electrode at various depths (to about 4 µm) from the surface are shown.

Calculation of the electric fields in this particular device example shows that the peak E-fields are at ~±4 µm (with reference to the electrode center), about ~1-2 µm from the edge of the 6 µm-wide central electrode.

It can be seen clearly that the MZ waveguide pair with a ~24 µm-spacing, is not optimum, since the electric fields inside these waveguide pair are much lower than the peak fields. The E-fields inside the waveguides are stronger if one can reduce the MZ waveguide pair spacing, and thus improve the modulation efficiency.

Figure 17:
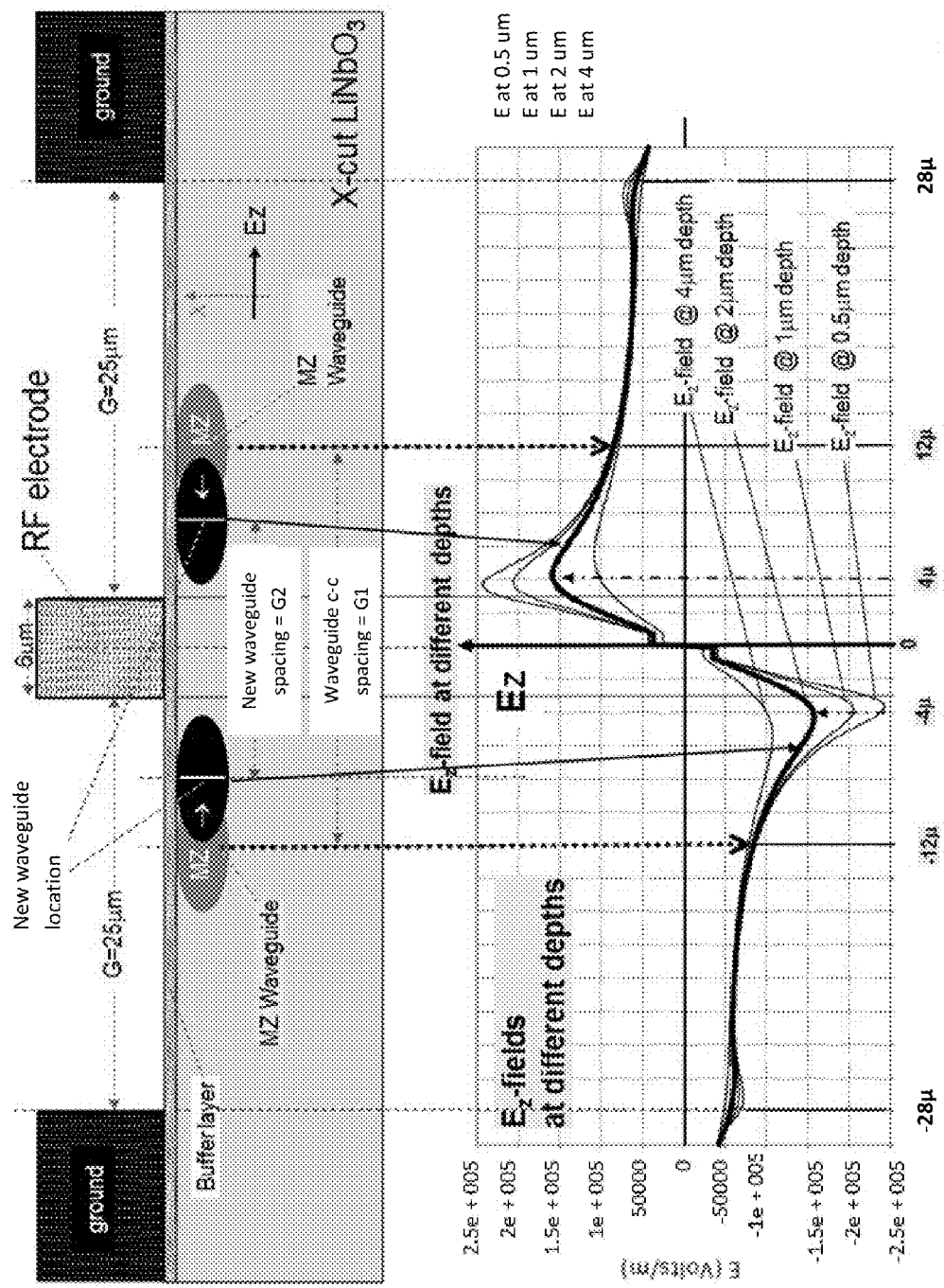
FIG. 17 is a cross-section view of an X-cut $LiNbO_3$ modulator, and the horizontal $E_z$-electrical field profile inside the $LiNbO_3$ substrate at various depths from the surface. This figure illustrates that the E-field inside the waveguide pair increases significantly when the waveguide spacing is reduced.

The E-fields inside the waveguides can be significantly increased if the waveguide spacing is reduced, as illustrated in FIG. 17 below, if the positions of the waveguides are closer the peak E-fields near the central electrode.

However, this is not always possible. Ideally, for a MZ waveguide structure, the spacing between the MZ waveguide pair must be large enough to avoid optical evanescent field coupling between the MZ waveguide pair. For an X-cut MZ modulators, operating at λ=1.55 µm, the waveguide spacing is typically >20-40 µm apart.

When the waveguide pair spacing is reduced, at some point, the waveguide separation will be too small that there is optical coupling between the waveguide pair via optical evanescent field coupling. Unfortunately, this optical coupling will result in a change in the optical transmission characteristics of the MZ interferometer device.

Figure 18:
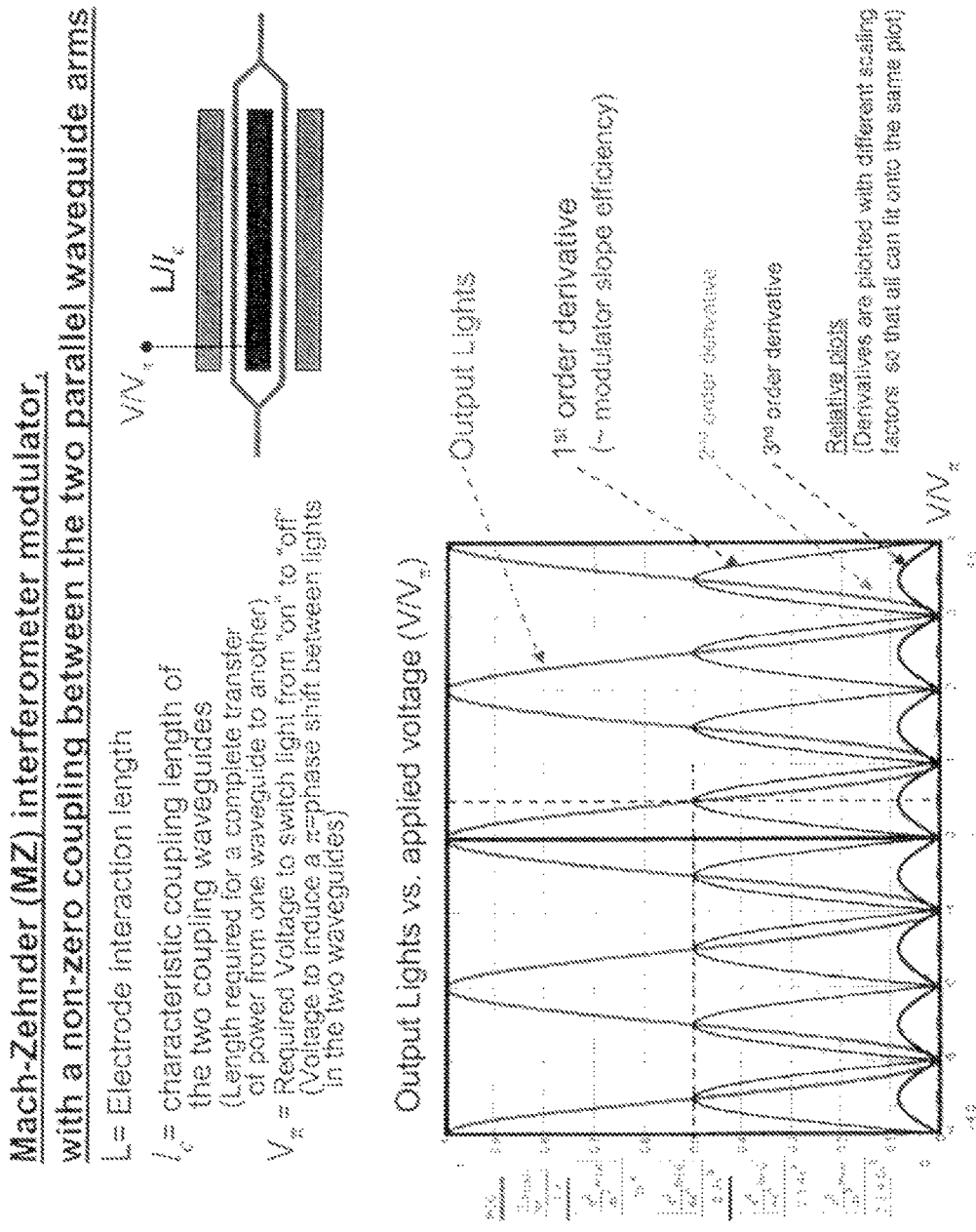
FIG. 18 shows the typical MZ response (Optical transmission vs. a normalized applied voltage—$V/V_\pi$) when the waveguide pair of the MZ interferometer are un-coupled.

FIG. 18 shows a typical calculated ideal MZ response (Optical transmission vs. a normalized applied voltage—V/$V_\pi$) when the waveguide pair of the MZ interferometer are un-coupled.

The (optical transmission vs normalized applied voltage) transfer function is the standard sinusoidal (cosine ^2) function of an ideal optical interferometer. The $1^{st}$ order derivative is also shown, which corresponds to the slope efficiency of the modulator. Ideally, the device is operated at $V/V_\pi=\pm\frac{1}{2}$ (via DC bias), where the slope efficiency ($1^{st}$ order derivative) is maximized.

Figure 19:
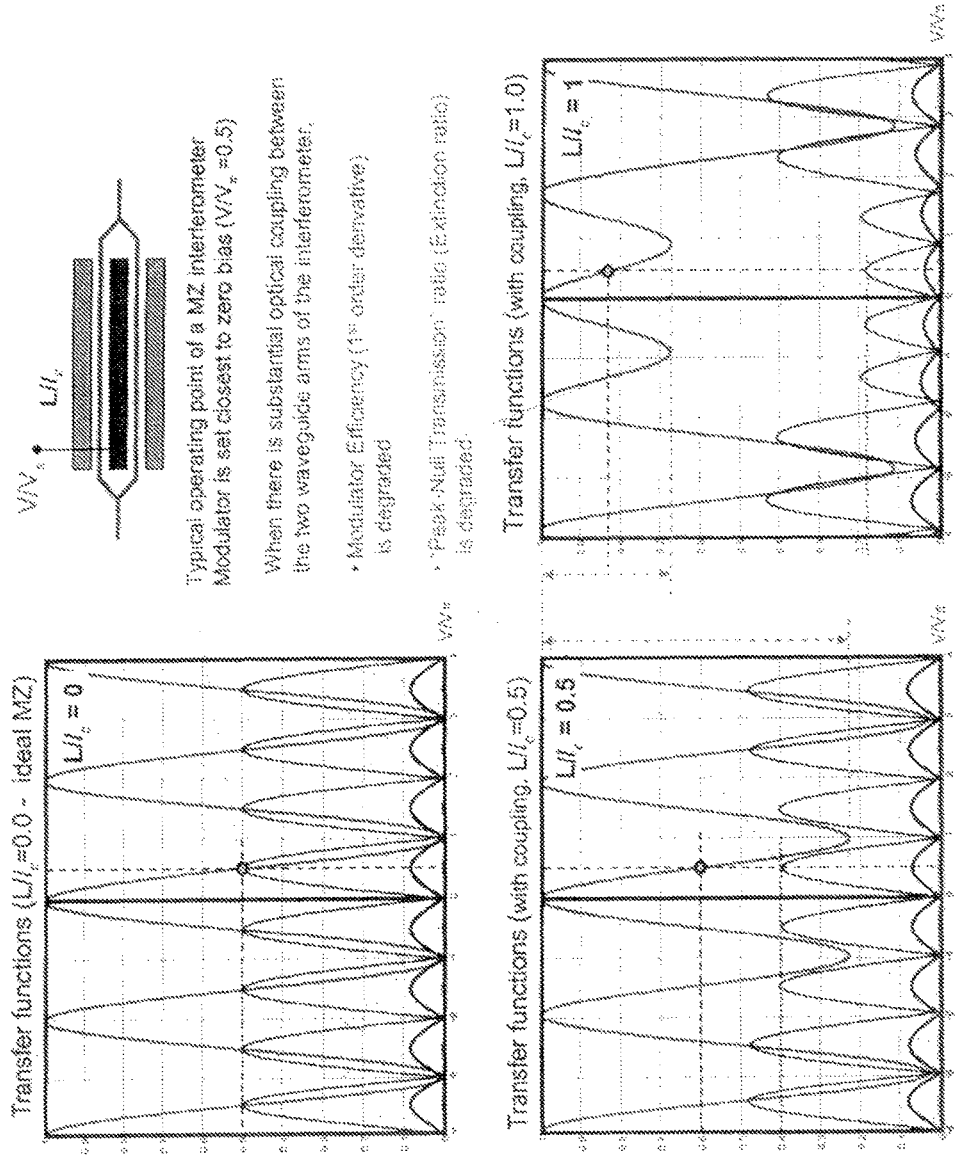
FIG. 19 shows calculated responses if there are substantial optical coupling between the waveguide pair, with L/lc=0 (for an ideal MZ with uncoupled waveguide pair), 0.5 and 1.0 respectively.

FIG. 19 shows typical calculated responses if there is optical coupling between the waveguide pair, with $L/l_c=0$ (ideal MZ with un-coupled waveguide pair), 0.5 and 1.0 respectively. L is the electrode interaction length, and $l_c$ is the characteristic coupling length of the coupled waveguide pair. ($l_c$ is defined as the minimum length required for a complete coupling from one waveguide to the other waveguide.) Calculation shows that when there is optical coupling between the waveguide pair, the transfer function can change substantially. The "Peak-Null" modulation depth or extinction ratio can be significantly degraded, as well as the slope efficiency ($1^{st}$ order derivative).

For example, for a device with $L/l_c=0.5$, the peak-null swing is reduced to only ~75%, and the relative slope efficiency degrades to 0.4 (as compared to ideal MZ with the slope efficiency at 0.5) at the $V/V_\pi=\pm\frac{1}{2}$ operating point. For a device with even stronger coupling, $L/l_c=1.0$, the peak-null swing is reduced to ~<40%, and the relative slope efficiency degrades to ~<0.2 (as compared to ideal MZ with the slope efficiency at 0.5) at the $V/V_\pi=\frac{1}{2}$ operating point. Therefore, reducing the waveguide spacing results in optical coupling which can substantially degrade the transfer characteristics.

If the central electrode width is increased substantially so that the peak electric fields move closer to the waveguide locations, the impedance of the transmission line will be too low and will not match a standard 50 ohm microwave transmission-line system. A larger central electrode width with respect to the electrode gap also degrades the microwave loss.

Therefore, giving a microwave transmission line design, the waveguide spacing has to be large enough to eliminate optical cross coupling for a conventional MZ interferometer type waveguide modulator.

While the invention has been described with reference to specific embodiments, modifications and variations of the invention may be constructed without departing from the scope of the invention, which is defined in the following claims.

I claim:

1. Apparatus comprising electro-optical waveguide modulators fabricated on an electro-optic substrate having:
   a singlemode optical waveguide input,
   a singlemode optical waveguide output,
   a pair of waveguides, each waveguide having more than one section with different waveguide indices in the middle section having first ends connected together and to the optical input at an optical waveguide Y-junction and having second ends connected together and to the optical output at another optical waveguide Y-junction forming an optical waveguide interferometer modulator structure,
   a transmission-line electrode with a central electrode including plural sections positioned between the coupled waveguides without overlying on the spaced waveguides, first and second outer ground electrodes positioned outward from the waveguide pair,
   a radio frequency electrical source connected to the transmission-line electrode.

2. The apparatus of claim 1, wherein the pair of waveguides in the middle section is closely-spaced so that they can be optically-coupled, wherein the coupled waveguide pair have asymmetric waveguides with large different waveguide indices so that the waveguide pair are effectively de-coupled wherein one or more sections of the asymmetric waveguide pair have alternating differential indices (n±Δn), and wherein the n+Δn and n−Δn correspond to the effective waveguide indices of the two waveguides in alternate sections.

3. The apparatus of claim 2, wherein the coupled waveguides comprise an asymmetric coupled waveguide pair.

4. The apparatus of claim 3, wherein the asymmetric coupled waveguide pair has sections with different widths having different waveguide fabrication parameters.

5. The apparatus of claim 4, wherein the coupled waveguides comprise first and second waveguides.

6. The apparatus of claim 5, wherein the first waveguide has a first n+Δn section and a second n−Δn section, and wherein the second waveguide has a first n−Δn section and a second n+Δn section.

7. The apparatus of claim 3, wherein the coupled waveguides have different waveguide indices (n±Δn), wherein the n corresponds to an effective waveguide index and wherein a difference in the waveguide indices is large enough so that the waveguides are effectively de-coupled.

8. The apparatus of claim 1, wherein the one of the outer ground electrodes has an input and an output connected via capacitor chips, so that the one outer electrode is RF-ground and a DC-float, a DC bias is connected to the one outer RF-ground and DC-float electrode to set an operating point of the modulator, and wherein the DC bias is applied to set a proper operating point of the modulator.

9. The apparatus of claim 8, further comprising both of the outer ground electrodes have inputs and outputs connected via capacitors, forming RF-ground and DC-float electrodes on both of the outer electrodes so that DC bias can be applied to both of the outer RF and DC-float electrodes.

10. The apparatus of claim 1, further comprising an electro-optic substrate, wherein the first ground is positioned along a first edge of the substrate, the second ground is positioned along a second opposite edge of the substrate, the electrode is positioned between the first and second grounds and is positioned closer to the first edge than to the second edge, and a slot in the substrate is provided extending from a first side of the substrate under the first ground, under the waveguide pair, under the electrode and under a part of the second ground.

11. The apparatus of claim 10, wherein the slot is formed by a dicing saw.

12. The apparatus of claim 10, wherein the slot forms a thin substrate under the first ground, the coupled waveguides, the electrode and a part of the second ground, and wherein the slot is an air gap or is filled with a low-loss low dielectric material.

13. Apparatus comprising electro-optical waveguide modulators fabricated on an electro-optic substrate having:
   a singlemode optical waveguide input,
   a singlemode optical waveguide output,
   a pair of waveguides having different waveguide fabrication parameters in the middle section having first ends connected together and to the optical input at an optical waveguide Y-junction and having second ends connected together and to the optical output at another optical waveguide Y-junction forming an optical waveguide interferometer modulator structure,
   a transmission-line electrode with a central electrode including plural sections positioned between the coupled waveguides, first and second outer grounds positioned outward from the waveguide pair without overlying on the spaced waveguides, a radio frequency electrical source connected to the transmission-line electrode, wherein the pair of waveguides in the middle section is closely-spaced so that they can be optically-coupled, wherein the coupled-waveguide pair have asymmetric waveguides with large different waveguide indices so that the waveguide pair are effectively de-coupled wherein one or more sections of the asymmetric waveguide pair comprise alternating differential indices (n±Δn), and wherein the n+Δn and n−Δn correspond to the effective waveguide indices of the two waveguides in alternate sections, wherein the coupled waveguides comprise an asymmetric coupled waveguide pair, wherein the asymmetric coupled waveguide pair has sections with different widths or different waveguide fabrication parameters, wherein the coupled waveguides comprise first and second waveguides, each having more than one section with different waveguide indices, wherein the first waveguide has an n−Δn first section, an n+Δn second section and an n−Δn third section, and the second waveguide has an n+Δn first section, an n−Δn second section and an n+Δn third section.

14. The apparatus of claim 13, wherein electric fields generated by first, second and third sections of the electrode are $E_1$, $E_2$ and $E_3$, wherein lengths of the waveguide sections are $L_1$, $L_2$ and $L_3$, and wherein cumulative electro-optic interaction between the electrode and the first and second waveguides is accomplished by lengths of the sections so that $E_2 \cdot L_2 = E_1 \cdot L_1 + E_3 \cdot L_3$, so that a zero-chirp modulation is achieved.

15. The apparatus of claim 13, wherein a number of the sections greater than three are used in the first and second waveguides.

16. Apparatus comprising electro-optical waveguide modulators fabricated on an electro-optic substrate having:
a singlemode optical waveguide input,
a singlemode optical waveguide output,
a pair of waveguides having different waveguide fabrication parameters in the middle section having first ends connected together and to the optical input at an optical waveguide Y-junction and having second ends connected together and to the optical output at another optical waveguide Y-junction forming an optical waveguide interferometer modulator structure,
a transmission-line electrode with a central electrode positioned between the coupled waveguides, first and second outer grounds positioned outward from the waveguide pair,
a radio frequency electrical source connected to the transmission-line electrode,
wherein the waveguide pair comprise first and second waveguides, and each of the first and second waveguides has more than one section,
wherein the central electrode is shaped to have more than one section positioned between the coupled waveguides without overlying on the coupled waveguides,
wherein sections of the electrode alternately are positioned closer to the first waveguide in the first section and closer to the second waveguide in the second section, respectively.

17. The apparatus of claim 16, wherein the electrode, the first and second grounds and the first and second waveguides each have first, second and third sections,
wherein the first section of the electrode is positioned closer to the first section of the first waveguide, the second section of the electrode is positioned closer to the second section of the second waveguide, and the third section of the electrode is positioned closer to the third section of the first waveguide.

18. The apparatus of claim 17, wherein the lengths of the sections are $L_1$, $L_2$ and $L_3$ and effective electrical fields generated by the electrode are $E_1$, $E_2$ and $E_3$ and the lengths of the sections are established so that $E_2 \cdot L_2 = E_1 \cdot L_1 + E_3 \cdot L_3$ to achieve zero-optical chirp operation.

19. The apparatus of claim 16, wherein the electrode and the first and second waveguides of the waveguide pair have more than three sections, wherein a first section of the first waveguide is positioned closer to the central electrode, a second section of the second waveguide is positioned closer to the central electrode, and a third section of the first waveguide is positioned closer to the central electrode, alternately from one section to the next section.

20. The apparatus of claim 19, wherein the first, second and third sections of the waveguides have lengths of $L_1$, $L_2$ and $L_3$ and effective electrical fields generated by the electrode are $E_1$, $E_2$ and $E_3$ respectively along lengths of $L_1$, $L_2$ and $L_3$ of the waveguides so that $E_2 \cdot L_2 = E_1 \cdot L_1 + E_3 \cdot L_3$ to achieve zero-optical chirp operation.

21. Apparatus comprising electro-optical waveguide modulators fabricated on an electro-optic substrate having:
a singlemode optical waveguide input,
a singlemode optical waveguide output,
a pair of waveguides in the middle section having first ends connected together and to the optical input at an optical waveguide Y-junction and having second ends connected together and to the optical output at another optical waveguide Y-junction forming an optical waveguide interferometer modulator structure,
a transmission-line electrode with a central electrode positioned between the coupled waveguides, first and second outer grounds positioned outward from the waveguide pair,
a radio frequency electrical source connected to the transmission-line electrode,
wherein the central electrode of the transmission-line electrode is shaped to have more than one section positioned between the coupled waveguides without overlying on the coupled waveguides, wherein the waveguide pair comprise first and second waveguides and each of the first and second waveguides has more than one section, and wherein the sections of the first waveguide are positioned alternately closer to and further from the central electrode section and wherein sections of the second waveguide are positioned alternately further from and closer to the central electrode section.

22. Apparatus comprising an interferometric waveguide structure having the following elements:
a substrate,
a singlemode optical waveguide input and a singlemode optical waveguide output in the electro-optic substrate,
a coupled waveguide having different waveguide fabrication parameters connected between the optical input and the optical output,
the waveguide further comprising
a divided pair of waveguides having a first waveguide and a second waveguide each having one or more sections with different waveguide indices,
a buffer layer on the substrate,
an electrode on the buffer layer including a plurality of sections between the first and second waveguides in the divided pair without overlying on the coupled waveguides, a radio frequency (RF) electrical source connected to the electrode, first and second grounds on the buffer layer spaced outward from the electrode, spaced outward from the pair of electrodes, and spaced outward from each other, a physical modification of at least one of the coupled waveguides, the electrode, the grounds or the substrate elements for increasing electro-optic interaction between the electrical signal in the electrode and the first and second waveguides.

23. A method comprising
providing an interferometric waveguide structure,
providing a substrate,
providing a singlemode optical input and a singlemode optical output in the substrate,
connecting a waveguide pair having different sections in different planes with alternating differential indices ($n \pm \Delta n$), wherein the $n+\Delta n$ and $n-\Delta n$ correspond to effective waveguide indices of the two waveguides in alternate sections (n+n) between the optical input and the optical output,
providing a first waveguide and a second waveguide in the waveguide pair,
providing a buffer layer on the substrate,
providing an electrode on the buffer layer between the first and second waveguides in the divided pair without overlying on the waveguide pair,
connecting a radio frequency (RF) electrical source to the electrode,
providing first and second grounds on the buffer layer, spacing first and second grounds outward from the electrode and outward from the pair of electrodes, and outward from each other of the grounds,
providing a modification of at least one of the waveguides, the electrode, the grounds or the substrate and increasing the electro-optic interaction between the electrical signal in the electrode and the first and second waveguides.

24. Apparatus comprising an interferometric modulator fabricated on an electro-optic material such as $LiNbO_3$, a pair of coupled asymmetric waveguides in the interferometric modulator and a transmission line electrode between and spaced from the coupled waveguides on the interferometric modulator, wherein the transmission line electrode does not overlie the pair of coupled waveguides, wherein the pair of coupled asymmetric waveguides have alternate opposite sections on different planes, and wherein the opposite sections have different effective waveguide indices and an electrical signal is launched into the transmission line electrode and propagates down the transmission-line, passing by sections of the coupled waveguides with asymmetric $\Delta n$.

25. The apparatus of claim 24, wherein multiple sections of the pair of coupled waveguides have alternate $\Delta n$ to achieve zero-chirp operation.

26. The apparatus of claim 25, wherein the alternate sections of the pair of coupled asymmetric waveguides achieves chirp-free operation by balancing out cumulative change in electro-optic induced index change between the pair of waveguides.

27. The apparatus of claim 25, wherein the multiple sections of an alternate $\Delta n$ pair of coupled asymmetric waveguides achieves chirp-free operation for a larger frequency range, taking into account that the electric field strength drops as a function of propagation distance down the transmission-line, due to RF propagation loss of the transmission line as a function of frequency.

28. The apparatus of claim 24, wherein the pair of coupled waveguides has a small waveguide spacing, and wherein the pair of coupled waveguides are closer to the central electrode in a higher electric field, resulting in higher electro-optic interaction and higher modulation efficiency.

29. The apparatus of claim 24, wherein the pair of coupled asymmetric waveguides have a large enough asymmetry in the waveguide indices that produces modulation depth response similar to a Mach Zehnder interferometer modulator with high modulation depth, while maintaining higher modulation efficiency owing to the pair of coupled waveguides being closer to the electrode.

30. Apparatus comprising electro-optical waveguide modulators fabricated on an electro-optic substrate having:
a singlemode optical waveguide input,
a singlemode optical waveguide output,
a pair of waveguides forming a first waveguide and a second waveguide in the middle section having first ends connected together and to the optical input at an optical waveguide Y-junction and having second ends connected together and to the optical output at another optical waveguide Y-junction forming an optical waveguide interferometer modulator structure,
each of the first waveguide and the second waveguide having more than two sections in the middle section, the sections having alternating differential indices ($n \pm \Delta n$), wherein $n+\Delta n$ and $n-\Delta n$ correspond to effective waveguide indices of two waveguides in alternate sections (n+n),
a transmission-line electrode with a central electrode having plural sections positioned between the coupled waveguides without overlying on the waveguide pair,
first and second outer grounds positioned outward from the waveguide pair, and
a radio frequency electrical source connected to the transmission-line electrode.

* * * * *